(12) United States Patent
Naruse

(10) Patent No.: US 11,852,591 B2
(45) Date of Patent: Dec. 26, 2023

(54) INSPECTION DEVICE AND METHOD

(71) Applicant: OMRON Corporation, Kyoto (JP)

(72) Inventor: Yosuke Naruse, Uji (JP)

(73) Assignee: OMRON Corporation, Kyoto (JP)

( * ) Notice: Subject to any disclaimer, the term of this patent is extended or adjusted under 35 U.S.C. 154(b) by 244 days.

(21) Appl. No.: 17/270,032

(22) PCT Filed: Feb. 25, 2020

(86) PCT No.: PCT/JP2020/007451
§ 371 (c)(1),
(2) Date: Feb. 21, 2021

(87) PCT Pub. No.: WO2020/189189
PCT Pub. Date: Sep. 24, 2020

(65) Prior Publication Data
US 2021/0364447 A1 Nov. 25, 2021

(30) Foreign Application Priority Data

Mar. 15, 2019 (JP) .................................. 2019-048163

(51) Int. Cl.
*G01N 21/88* (2006.01)
*G06T 7/00* (2017.01)

(52) U.S. Cl.
CPC ......... *G01N 21/8806* (2013.01); *G06T 7/001* (2013.01); *G06T 2207/30164* (2013.01)

(58) Field of Classification Search
CPC ......... G01N 21/8806; G01N 2021/845; G01N 2021/8887; G01N 21/8851;
(Continued)

(56) References Cited

U.S. PATENT DOCUMENTS 10,863,069 B2 * 12/2020 Hwang .............. G01N 21/8806

FOREIGN PATENT DOCUMENTS

| EP | 2887055 | 6/2015 |
| JP | 2002197448 | 7/2002 |

(Continued)

OTHER PUBLICATIONS

"Search Report of Europe Counterpart Application", dated Nov. 21, 2022, pp. 1-11.
(Continued)

*Primary Examiner* — Tri T Ton
(74) *Attorney, Agent, or Firm* — JCIPRNET

(57) ABSTRACT

This inspection device comprises: image-capturing unit obtaining an evaluation workpiece image that is captured with a plurality of predetermined illumination light emission patterns; image area setting unit setting a plurality of image areas associated with a plurality of different labels; optimization calculation unit generating a first index of which the output value increases as a difference between an image area associated with a non-defective label and a defective label increases, and a second index of which the output value increases as a difference or contrast between the image areas associated with the non-defective label increases, and calculates an illumination light emission pattern for inspection such that the first index becomes larger and the second index becomes smaller; and determination unit performing image processing on an inspection workpiece image captured with the illumination light emission pattern for inspection, and determines a pass/fail label of a workpiece to be inspected.

14 Claims, 19 Drawing Sheets

(58) Field of Classification Search
CPC ........... G06T 2207/30164; G06T 7/001; G06T 2200/24; G06T 2207/10016; G06T 2207/10024; G06T 2207/10152; G06T 2207/20081; G06T 2207/20084; G06T 2207/20104; G06T 2207/20221; G06V 10/25; G06V 10/772; G06V 2201/06
USPC ...................... 356/237.1–237.6, 239.1–239.8
See application file for complete search history.

(56) References Cited

FOREIGN PATENT DOCUMENTS

| | | |
|---|---|---|
| JP | 2004294358 | 10/2004 |
| JP | 2018189558 | 11/2018 |
| JP | 2018189561 | 11/2018 |
| JP | 2018200328 | 12/2018 |
| JP | 2019035609 | 3/2019 |

OTHER PUBLICATIONS

Chao Liu et al., "Discriminative Illumination: Per-Pixel Classification of Raw Materials Based on Optimal Projections of Spectral BRDF", IEEE Transactions on Pattern Analysis and Machine Intelligence, Jan. 2014, pp. 86-98.

Chao Liu et al.,"Learning Discriminative Illumination and Filters for Raw Material Classification with Optimal Projections of Bidirectional Texture Functions", 2013 IEEE Conference on Computer Vision and Pattern Recognition (CVPR), Jun. 2013, pp. 1430-1437.

Robin Gruna et al., "Optical feature extraction with illumination-encoded linear functions", Image Processing: Machine Vision Applications V, Feb. 2012, pp. 1-10.

Robin Gruna et al: "Acquisition and Evaluation of Illumination Series for Unsupervised Defect Detection", 2011 IEEE International Instrumentation and Measurement Technology Conference, May 2011, pp. 1-6.

"International Search Report (Form PCT/ISA/210) of PCT/JP2020/007451", dated Apr. 21, 2020, with English translation thereof, pp. 1-4.

"Written Opinion of the International Searching Authority (Form PCT/ISA/237) of PCT/JP2020/007451", dated Apr. 21, 2020, with English translation thereof, pp. 1-7.

"Office Action of Japan Counterpart Application" with English translation thereof, dated Feb. 22, 2022, p. 1-p. 6.

* cited by examiner (A)

(B)

INSPECTION DEVICE AND METHOD

CROSS-REFERENCE TO RELATED ART

The present application is based on Japanese Patent Application No. 2019-048163 filed on Mar. 15, 2019, the entire contents of which are incorporated herein.

TECHNICAL FIELD

The present invention relates to an inspection device for a target and a method.

BACKGROUND ART

Product appearance inspection in manufacturing sites is one of the fields in which replacement of human workers with machines is least advanced, and this is an important problem concerning automation that has to be addressed with a decrease in working population in the future. In recent years, automation techniques for inspection have been dramatically improved due to development of artificial intelligence and machine learning techniques, representative examples of which include deep learning.

However, a process that requires the most time and efforts when constructing an inspection system in general appearance inspection and machine vision is designing of an imaging system including optimization design of an illumination pattern, and automation of this field is not very advanced. In a case in which persons manually perform optimization design, a large amount of effort is needed to design an imaging system to reliably detect defects such as scratches that have occurred on workpieces while addressing variations in individual workpieces (to be inspected). In other words, it is essential to alternately repeat optimization of illumination through manual adjustment and review and adjustment of inspection algorithms while exchanging various target workpieces in order to obtain desired detection performance, and to do so, there is a problem that a significantly large number of processes are needed.

In order to address this problem, a method of optimizing an illumination pattern to detect defects in workpieces on the basis of a group of images captured using a plurality of illumination patterns has been reported in Patent Literature 1, for example.

CITATION LIST

Patent Literature

[Patent Literature 1]
  EP2887055A1

SUMMARY OF INVENTION

Technical Problem

According to such a method in the related art, optimization design of an illumination light emission pattern is performed simply from a viewpoint of emphasizing defects in workpieces. In other words, there is a tendency that an optimal illumination light emission pattern is determined simply on the basis of an index indicating a difference between non-defective products with no defects (acceptable products, products with no defects) and defective products with defects (non-acceptable products, products with defects, poor products). However, since there are various appearances and various surface states depending on workpieces, and defects that may occur in workpieces have various characteristics, there is a concern that it may be difficult to distinguish between background images of the workpiece surfaces and defects and that portions that are not defects may be determined as defects when only defects are emphasized. In a case in which, so-called hairline finishing has been performed on an entire workpiece surface, and linear scratch, for example, has occurred in a part of the surface, for example, there is a concern that a hairline (linear mark) on the workpiece surface may also be emphasized with an illumination pattern for emphasizing scratching. If this situation happens, the scratch is not determined as a defect, and there is a likelihood that a defective product will be missed, or a linear mark in the background will be erroneously determined as a defect.

In other words, a background image for a workpiece surface has random variations in a normal portion of a workpiece without defects and random variations between individual workpieces with no defects (non-defective products) (these can also be referred to as "variations in a non-defective product" and "variations in individual products"), and an idea itself of curbing the variations in anon-defective product or variations in individual products which are workpieces has not been introduced to optimization of an illumination pattern in the method in the related art.

Thus, the present disclosure was made in view of such circumstances in one aspect, and an objective thereof is to provide an inspection method, an inspection device, and the like capable of obtaining an optimized illumination light emission pattern with which influences of variations in a non-defective product or variations in individual products which are workpieces can be curbed while emphasizing defects in workpieces.

Solution to Problem

The present invention employs the following configurations in order to solve the aforementioned problem.

[1] An inspection device according to an example of the present disclosure includes: an image-capturing unit which has a sensor that images at least one workpiece illuminated in a plurality of predetermined illumination light emission patterns and obtains a plurality of evaluation workpiece images that are associated with the predetermined illumination light emission patterns and the workpiece; an image area setting unit which sets, for the evaluation workpiece images, a plurality of image areas associated with a plurality of different labels that indicate non-defective products or defective products; an optimization calculation unit which generates, from the image areas, a first index, an output value of which increases as differences between image areas associated with labels indicating the non-defective products and image areas associated with labels indicating the defective products increase, generates a second index, an output value of which increases as differences between the image areas associated with the labels indicating the non-defective products increase or as contrast in the image areas associated with the labels indicating the non-defective products increases, and calculates an illumination light emission pattern for inspection such that (an evaluation value of) the first index becomes larger and (an evaluation value of) the second index becomes smaller; and a determination unit which performs image processing on an inspection workpiece image obtained by the image-capturing unit imaging a workpiece to be inspected illuminated in the illumination light emission pattern for inspection to thereby determine a pass/fail label of the workpiece to be inspected.

With this configuration, it is possible to extract images in a region of interest in the plurality of evaluation workpiece images and to set image areas (or a group thereof) for the combination of the plurality of different labels indicating non-defective products or defective-products and at least one region of interest with a predetermined shape from the evaluation workpiece images obtained by imaging the workpiece illuminated in the plurality of predetermined illumination light emission patterns. From the obtained image areas, a first index indicating variations in workpieces belonging to different labels (for example, variations between non-defective products and defective products) is set on the basis of varying components between images belonging to different labels, and a second index indicating variations in workpieces belonging to the same label (for example, variations in a non-defective product or variations in individual products) is set on the basis of varying components between images belonging to the same label. Then, an illumination parameter vector as an optimized solution that increases or maximizes the first index and decreases or minimizes the second index when at least one workpiece is illuminated and imaged in an illumination light emission pattern for evaluation corresponding to an arbitrary combination of a plurality of predetermined illumination light emission patterns is obtained. Then, an inspection workpiece image for a workpiece to be inspected is acquired using an optimized illumination light emission pattern obtained on the basis of the illumination parameter vector, and label determination of the workpiece (for example, inspection regarding whether or not there are defects such as scratches) is performed.

Therefore, it is possible to emphasize defects such as scratches in the workpiece (to increase the difference between the non-defective products and defects to allow the defects to be easily recognized), for example, and also to curb influences of random variations in a non-defective product or variations in individual products caused by a background image of the workpiece (to reduce variations in a non-defective product). It is thus possible to reduce missing of defects in workpieces and determination errors and thereby to improve inspection performance and inspection efficiency of workpieces. As described above, the inspection device according to the present disclosure is realized for the first time by newly introducing a point of view of curbing variations in a non-defective product or variations in individual products which are workpieces, which has not been used in the method in the related art, to optimization of an illumination pattern in inspection of the workpieces.

Note that the "labels" indicate features to be inspected of the workpieces, the features to be inspected are not particularly limited, and any features to be inspected may be employed as long as the features are features of the workpiece 4 that are to be inspected. Examples thereof include data indicating an appearance feature (for example, scratch, the size, or the like) of the workpiece as well as data indicating which of a non-defective product (acceptable product) or a defective product (non-acceptable product) the workpiece is, as described above.

[2] More specifically, in the aforementioned configuration, the optimization calculation unit may be adapted such that the number of light emission patterns to be evaluated when the illumination light emission pattern for inspection is calculated is larger than the number of the predetermined illumination light emission patterns.

[3] Further specifically, in the aforementioned configuration, the optimization calculation unit may generate an evaluation function on the basis of the first index and the second index and obtain an optimized solution such that when a certain illumination light emission pattern for evaluation is provided, and when the first index becomes a maximum value and the second index value becomes a minimum value at the time of illuminating and imaging the at least one workpiece, an evaluation value of the evaluation function becomes a maximum.

[4] More specifically, in the aforementioned configuration, the optimization calculation unit may obtain, through discriminant analysis (DA), an optimized solution that maximizes an evaluation value of an evaluation function (of a ratio type) based on a ratio between the first index and the second index or an evaluation value of an evaluation function (of a difference type) based on a difference between the first index and the second index, for example. Note that as the discriminant analysis, linear discriminant analysis (LDA) using multivariate analysis is particularly effective, and examples of a specific algorithm thereof include the Fisher's linear discriminant analysis (FDLA).

With such a configuration, if imaging using a light source that performs irradiation in a plurality of predetermined illumination light emission patterns is regarded as an arithmetic operation, mathematically a simple inner product arithmetic operation and linear projection themselves are to be performed. According to the linear discriminant analysis, for example, an arithmetic operation for generating a feature vector is a simple inner product arithmetic operation, and it is thus possible to obtain optimal linear projection with a simple algorithm. Also, if an evaluation function based on a ratio between the first index and the second index is used in the discriminant analysis, it is possible to directly analyze maximization of the first index and minimization of the second index. In addition, if such an evaluation function of a ratio type is used, it is possible to suitably obtain optimized solutions of both an illumination light emission pattern (single shot) based on a single illumination parameter vector and an illumination light emission pattern (multiple shots) based on a plurality of illumination parameter vectors (that is, an illumination parameter matrix). On the other hand, it is possible to analyze the maximization of the first index and the minimization of the second index using an evaluation function based on a difference between the first index and the second index in the discriminant analysis, and it is possible to obtain an optimal solution of in a single shot, in particular, at a high speed.

[5] In the aforementioned configuration, the optimization calculation unit may include a restriction condition that all components of the illumination parameter vectors are non-negative values in the discriminant analysis. For example, an optimal projection direction in the Fisher's linear discriminant analysis can be obtained as a maximum eigenvector of an eigenvalue in a general eigenvalue problem by a Lagrange undetermined multiplier method, and as an illumination pattern, an illumination parameter (intensity) vector may be set in a direction that follows the eigenvector. However, since it is not possible to realize a negative illumination intensity in actual illumination although components of the eigenvector can be negative values, this point may be problematic in optimization of illumination. In this regard, with this configuration, the restriction condition that all the components of the illumination parameter vector (eigenvector) are non-negative values is provided in the discriminant analysis, and it is thus possible to obtain an optimized illumination parameter vector, all the components of which are non-negative values. Note that since it is difficult to apply a solution as a general eigenvalue problem in this case, a solution to which a mathematical programming method, for example, is applied is effective.

[6] In the aforementioned configuration, in a case in which an illumination parameter vector obtained as the optimized solution includes components of positive values and negative values, the optimization calculation unit may obtain a first optimized illumination light emission pattern based on vectors configured with the components of the positive values and obtains a second optimized illumination light emission pattern based on vectors configured with absolute values of the components of the negative values, the image-capturing unit may acquire a first image and a second image by imaging the workpiece to be inspected with illumination in the first optimized illumination light emission pattern and the second optimized illumination light emission pattern, respectively, and the determination unit may acquire the inspection workpiece image on the basis of a difference between the first image and the second image.

With this configuration, it is possible to obtain a maximum eigenvector of an eigenvalue in a general eigenvalue problem that can be a negative value as an optimized solution that mathematically completely reproduces an illumination intensity of a negative value through pseudo reproduction of the illumination intensity of the negative value, unlike [5] described above. In other words, it is possible to obtain effects equivalent to those obtained by directly imaging the workpiece to be inspected in an optimized illumination light emission pattern based on the original optimized illumination parameter vector in which the positive values and the negative values are present together in a pseudo manner.

[7] In the aforementioned configuration, in a case in which an illumination parameter vector obtained as the optimal solution includes components of positive values and negative values, the optimization calculation unit may choose, as the illumination parameter vectors, a plurality of eigenvectors with large eigenvalues in main component analysis, obtain a first optimized illumination light emission pattern based on vectors configured with the components of the positive values, and obtain a second optimized illumination light emission pattern based on vectors configured with absolute values of the components of the negative values for each of the plurality of eigenvectors, the image-capturing unit may acquire a first image and a second image by imaging the workpiece to be inspected with illumination in the first optimized illumination light emission pattern and the second optimized illumination light emission pattern corresponding to each of the plurality of eigenvectors, and the determination unit may acquire the inspection workpiece image on the basis of a difference between the first image and the second image.

Even with this configuration, it is possible to obtain the maximum eigenvector of the eigenvalue in the general eigenvalue problem that can be a negative value as an optimal solution that mathematically completely reproduces an illumination intensity of the negative value through pseudo reproduction of the illumination intensity of the negative value, unlike [5] described above. In other words, it is possible to obtain, in a pseudo manner, effects equivalent to those obtained when the workpiece to be inspected is imaged directly in the illumination light emission pattern (multiple shots) of the plurality of original illumination parameter vectors in which positive values and negative values are present together. Also, since this configuration substantially provides multi-shot inspection using a plurality of shots, it is possible to significantly enhance inspection performance as compared with single-shot inspection. Moreover, since a dark current offset value is cancelled by employing the difference between the first image and the second image, it is also possible to omit dark current correction if black levels of both the images are the same.

[8] In the aforementioned configuration, in a case in which the illumination light emission pattern for evaluation is for multiple shots, the optimization calculation unit may calculate an optimized illumination light emission pattern for multiple shots that maximizes the first index and minimizes the second index when the at least one workpiece is illuminated and imaged in an illumination light emission pattern for evaluation corresponding to one column vector obtained by superimposing the plurality of illumination parameter vectors configuring the illumination light emission pattern for evaluation. With this configuration, one column vector is an illumination parameter matrix including a plurality of illumination parameter vectors, and it is possible to obtain an illumination light emission pattern for optimal multiple shots with an arbitrary number of imaged shots.

[9] With the aforementioned configuration, a form of image processing performed by the determination unit may be linear image processing, and optimization performed by the optimization calculation unit to maximize the first index and minimize the second index and optimization of image processing parameters used in image processing performed by the determination unit may be performed at the same time. With this configuration, it is possible to handle both single-shot inspection and multi-shot inspection and to optimize an illumination light emission pattern used in an inspection stage and linear image processing at the same time.

[10] In the aforementioned configuration, the optimization calculation unit may perform linear image processing on the evaluation workpiece images prior to the calculation of the optimized illumination light emission pattern. It is possible to handle both the single-shot inspection and the multi-shot inspection with this configuration as well. Also, it is possible to cause images to conform to each other or to be divergent from each other by focusing only on a specific frequency band, and further, it is possible to suitably cause images to conform to each other or to be divergent from each other even in a case in which processing of cutting DC components is included to ignore variations in offset due to a change with time.

[11] With the aforementioned configuration, in the image area setting unit or the optimization calculation unit, both the first index and the second index may be total values of varying components of pixel values in images in regions of interest (ROI) with the same labels. As described above, illumination design based on the Fisher's linear discrimination, for example, has evaluation criteria that differences between non-defective products and defects are caused to increase to allow the defects to be easily recognized and that variations in a non-defective product are reduced, and this is a method focusing on differences among a plurality of images. However, there is a case in which it is more convenient to calculate an evaluation value from a single image and to maximize or minimize the evaluation value (for example, a case in which it is desired to simply increase or decrease contrast in a specific region) than to handle differences among images, depending on problem setting. In this regard, since this configuration substantially corresponds to evaluation using a single image, the configuration is useful for the case in which an evaluation value calculated from a single image is maximized or minimized.

[12] In the aforementioned configuration, the optimization calculation unit may obtain a plurality of the optimized illumination light emission patterns on the basis of a plurality of illumination parameter vectors obtained as the optimized solution (suitable solution) in a case in which weights are applied to the first index and the second index. With this configuration, it is possible to prepare a plurality of optimized solutions with clear differences (inflections) through selection or exclusion of conditions and to allow a user to perform comparison and consideration, for example. Also, it is possible to cause how images are close to each other (degrees of coincidence) and an evaluation value from a single image to be present together as evaluation criteria or to set individual weights for how images are close to each other (degrees of coincidence) and the evaluation value from the single image. Moreover, it is also possible to individually set weights for differences in regions of interest. Also, a weight between images for evaluation (sample images), a weight in a single image evaluation scheme, weights of regions of interest, and a weight of a balance between maximization and optimization can be independently adjusted, and it is possible to allow the user to easily perform adjustment.

[13] Also, an example of an inspection method according to the present disclosure is a method for inspecting a workpiece using an inspection device that includes an image-capturing unit, an image area setting unit, an optimization calculation unit, and a determination unit, the method including: by the image-capturing unit, imaging at least one workpiece illuminated in a plurality of predetermined illumination light emission patterns to acquire a plurality of evaluation workpiece images, each of which is associated with each predetermined illumination light emission pattern and each workpiece; by the image area setting unit, setting a plurality of image areas associated with a plurality of different labels that indicate non-defective products or defective products for the evaluation workpiece images; by the optimization calculation unit, generating a first index, an output value of which increases as differences between image areas associated with labels indicating the non-defective products and image areas associated with labels indicating the defective products increase, generating a second index, an output value of which increases as differences between the image areas associated with the labels indicating the non-defective products increase or as contrast in the image areas associated with the labels indicating the non-defective products increases, from the image areas, and calculating an illumination light emission pattern for inspection such that (an evaluation value of) the first index becomes larger and (an evaluation value of) the second index becomes smaller; and by the determination unit, performing image processing on an inspection workpiece image obtained by the image-capturing unit imaging a workpiece to be inspected illuminated in the illumination light emission pattern for inspection to determine a pass/fail label of the workpiece to be inspected. With this configuration, effects and advantages equivalent to those in the example of the inspection device according to the present disclosure described above in [1] are achieved.

[15] Also, an example of a recording medium according to the present disclosure is a computer-readable non-transitory recording medium that records a control program for causing a computer to execute the imaging of at least one workpiece, the setting of the image areas, and the calculating of the illumination light emission pattern for the optimization, and the determining of the pass/fail label.

Note that in the present disclosure, "units" and "devices" do not simply mean physical means but include configurations realizing functions that the "units" and the "devices" have using software. Also, functions that one "unit" or one "device" has may be realized by two or more physical means or devices, or alternatively, functions of two or more "units" or "devices" may be realized by one physical means or device. Further, "units" and "devices" are concepts that can be stated as "means" and "systems", for example, instead.

Advantageous Effects of Invention

According to the present disclosure, image areas in appropriate regions of interest are set from evaluation workpiece images, and a first index indicating variations in workpieces belonging to different labels (for example, variations between non-defective products and defective products) and a second index indicating variations in workpieces belonging to the same label (for example, variations in a non-defective product or variations in individual products) are set. Then, it is possible to calculate an illumination parameter vector as an optimized solution through optimization using both the first index and the second index and to determine the label of the workpiece to be inspected using an optimized illumination light emission pattern obtained on the basis of the illumination parameter vector. It is thus possible to emphasize defects such as scratches in the workpieces (to increase differences between non-defective products and defects to allow the defects to be easily recognized), for example, and to curb influences of random variations in a non-defective product or variations in individual products caused by the background image of the workpieces (to reduce variations in a non-defective product). In this manner, it is possible to reduce missing of defects in workpieces and determination errors and to realize improvement in inspection performance and inspection efficiency of workpieces. Also, it is possible to improve a processing speed (throughput) in the entire system including the inspection device, to save the storage capacity, to reduce the amount of data to be communicated, and to enhance reliability of inspection through such efficient inspection processing.

Figure 6:
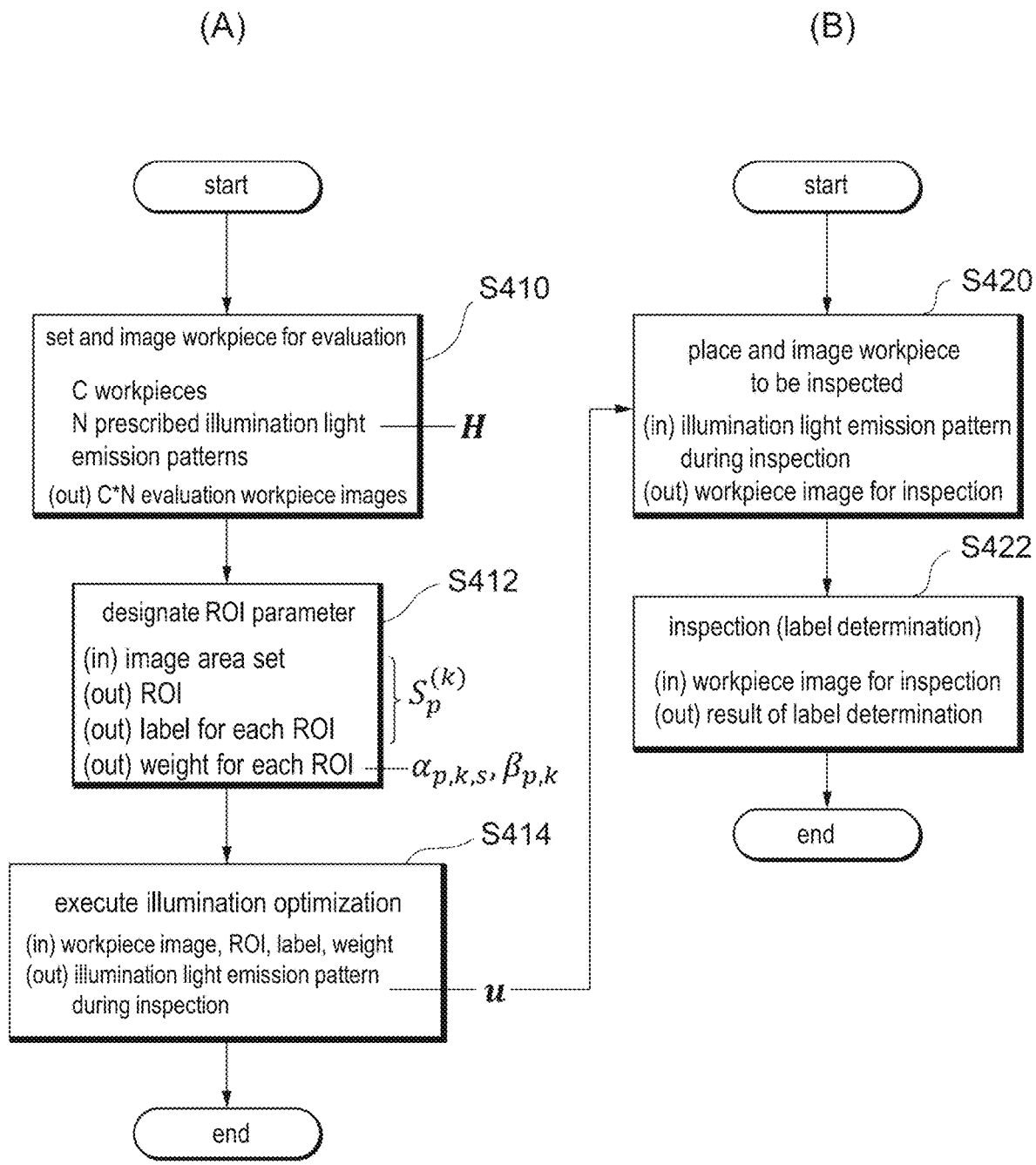

(A) of FIG. 6 and (B) of FIG. 6 are flowcharts illustrating an example of processing procedures in an illumination optimization stage and an inspection stage according to the embodiment of the present disclosure, respectively.

Figure 7:
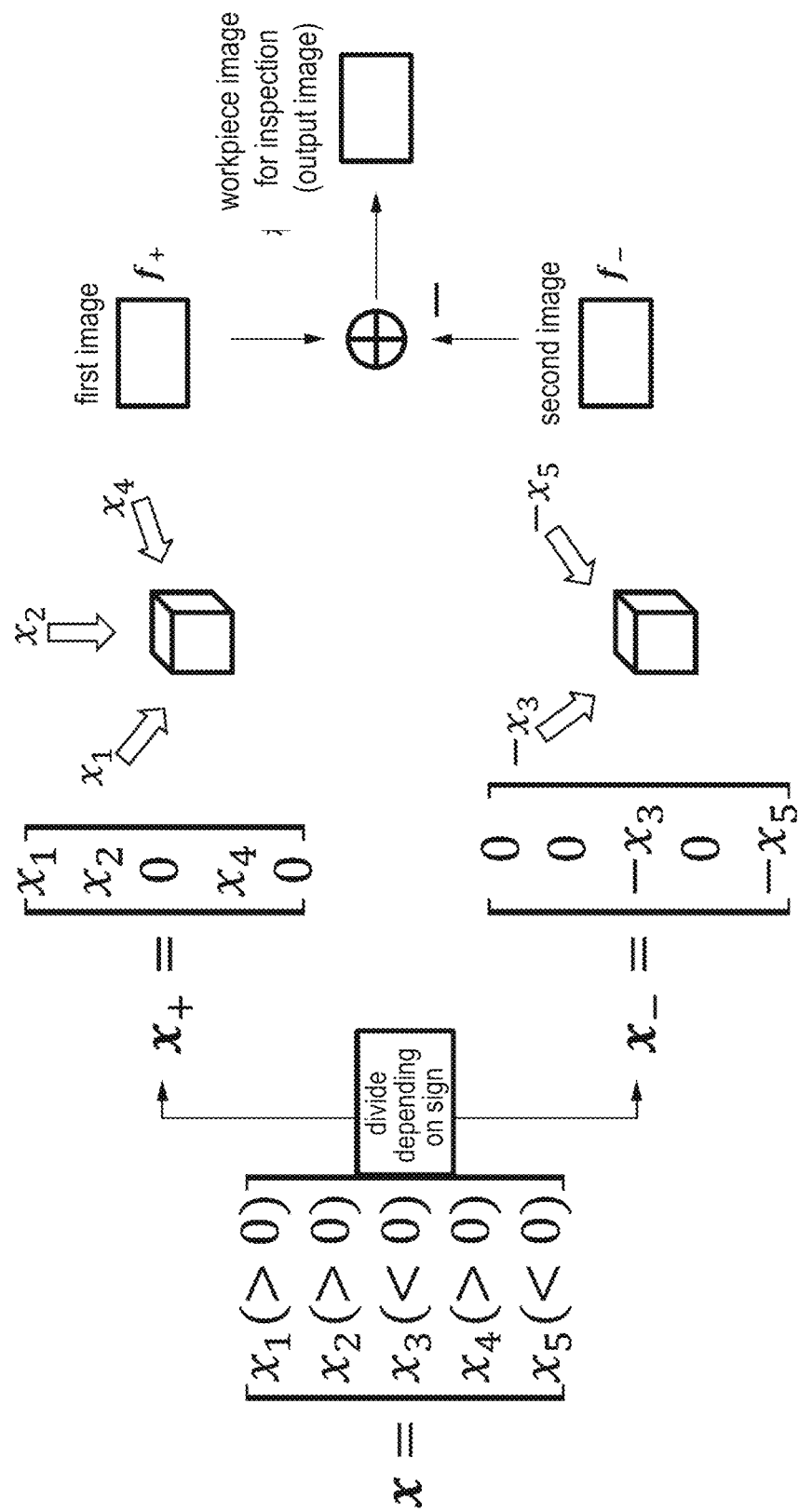

FIG. 7 is a schematic view illustrating an overview of a procedure for acquiring an inspection workpiece image according to a third modification example.

Figure 8:
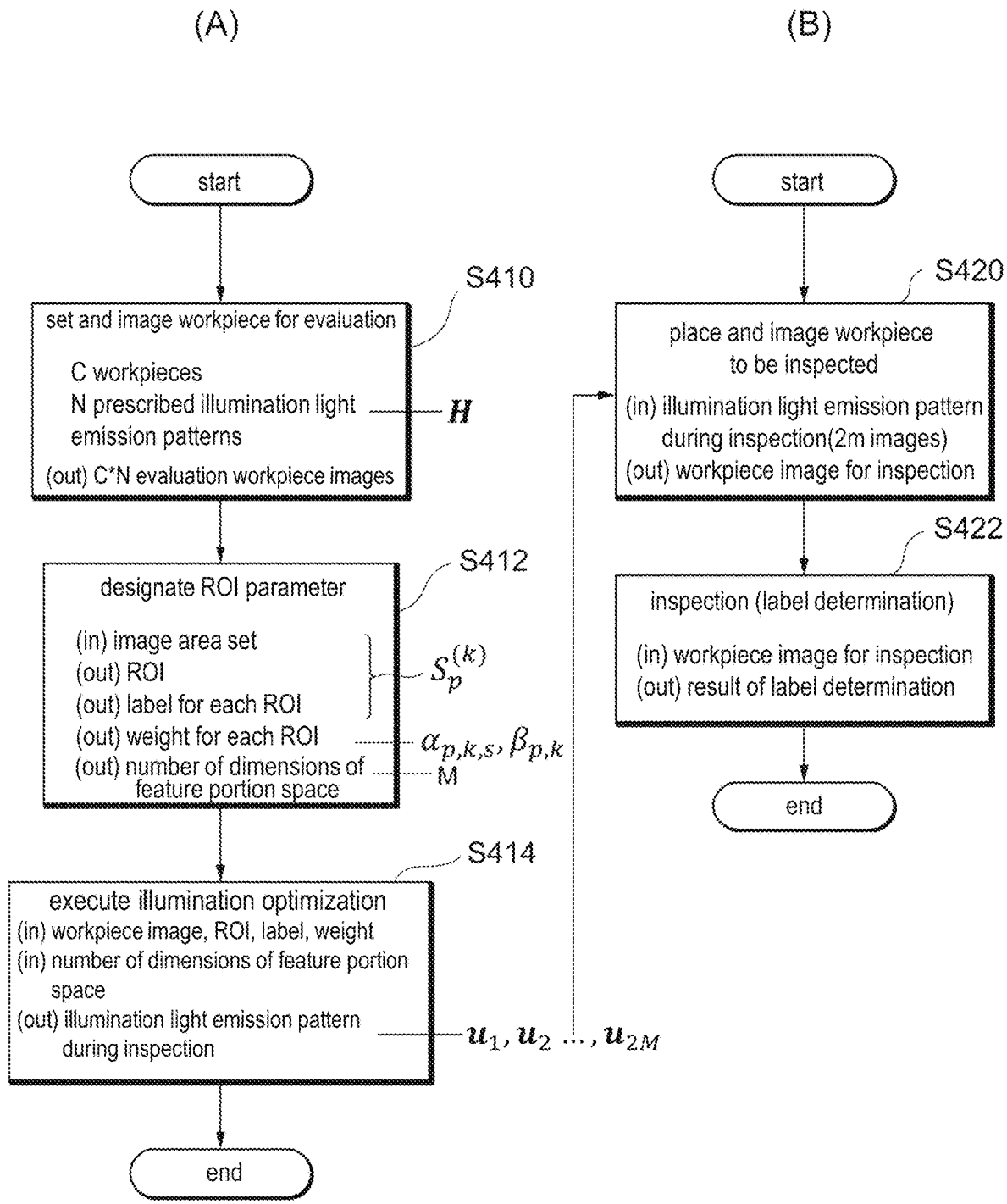

(A) of FIG. 8 and (B) of FIG. 8 are flowcharts illustrating an example of processing procedures in an illumination optimization stage and an inspection stage according to a fourth modification example, respectively.

Figure 9:
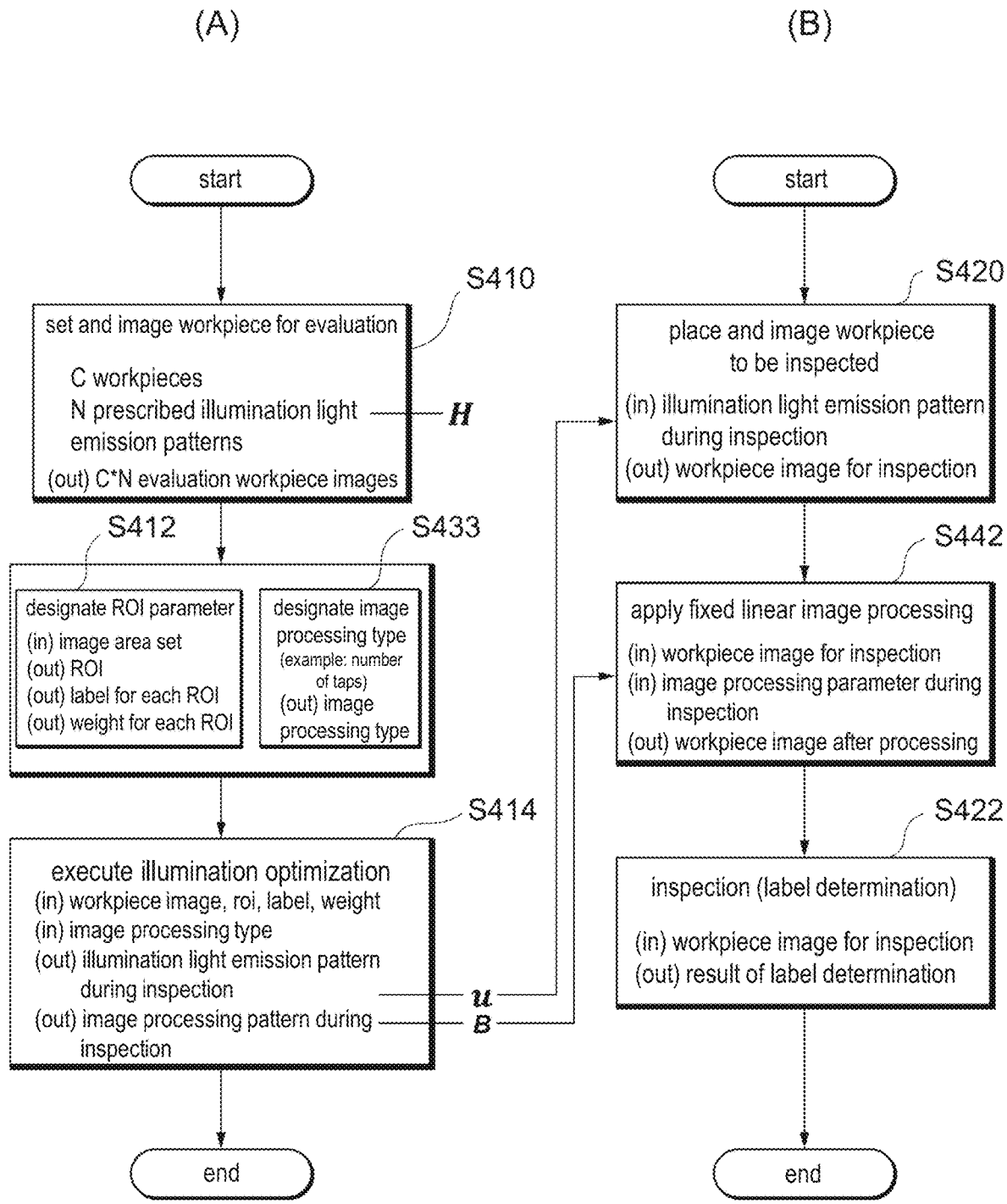

(A) of FIG. 9 and (B) of FIG. 9 are flowcharts illustrating an example of processing procedures in an illumination optimization stage and an inspection stage according to a sixth modification example, respectively.

Figure 10:
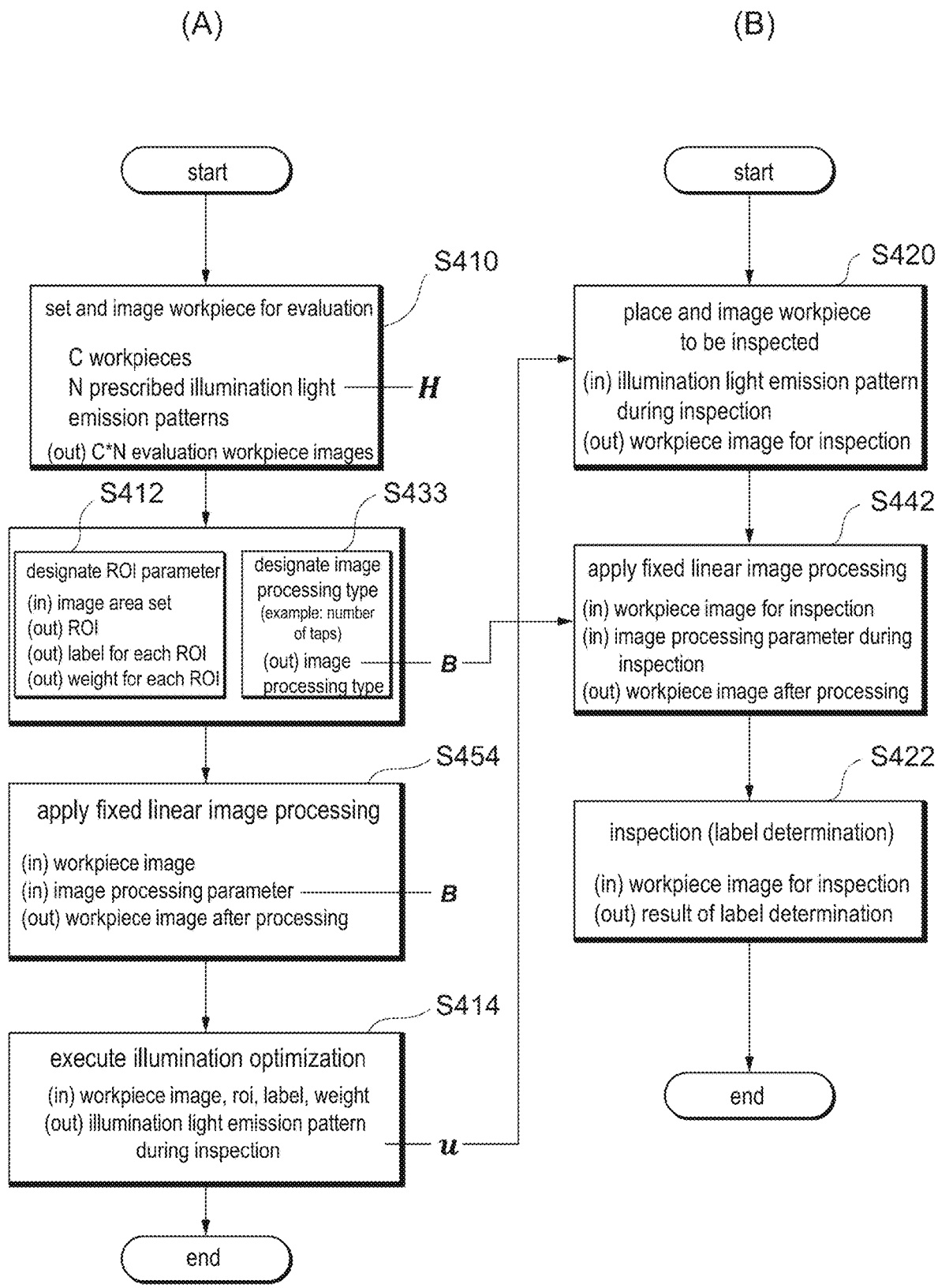

(A) of FIG. 10 and (B) of FIG. 10 are flowcharts illustrating an example of processing procedures in an illumination optimization stage and an inspection stage according to a seventh modification example, respectively.

Figure 11:
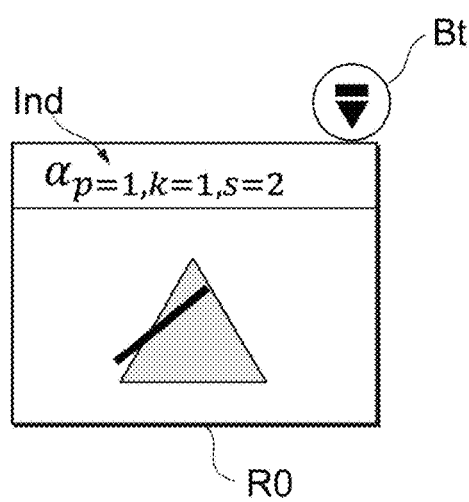
Figure 11:
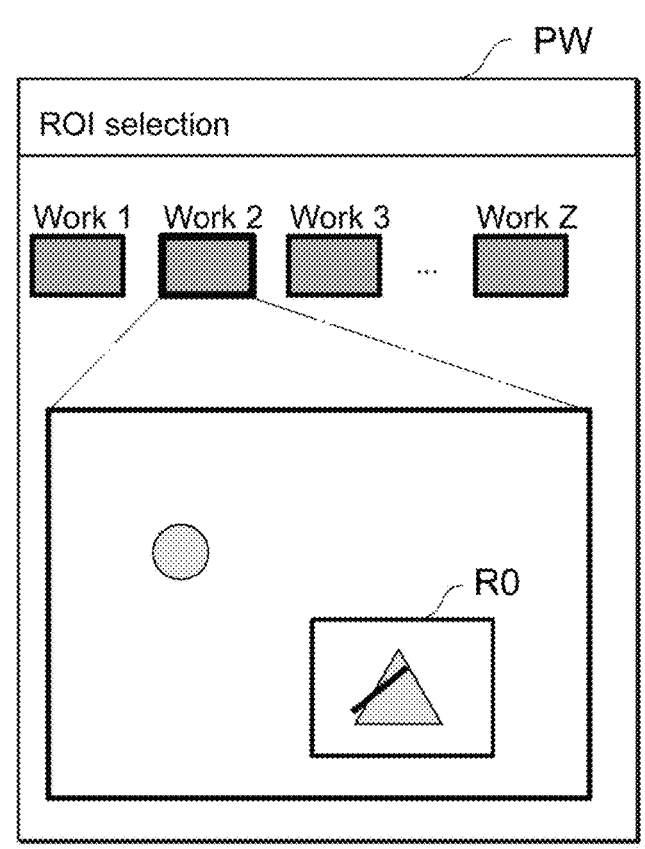

(A) of FIG. 11 and (B) of FIG. 11 are schematic plan views illustrating an example of a display screen of a user interface in an example of the inspection device according to the embodiment of the present disclosure.

Figure 12:
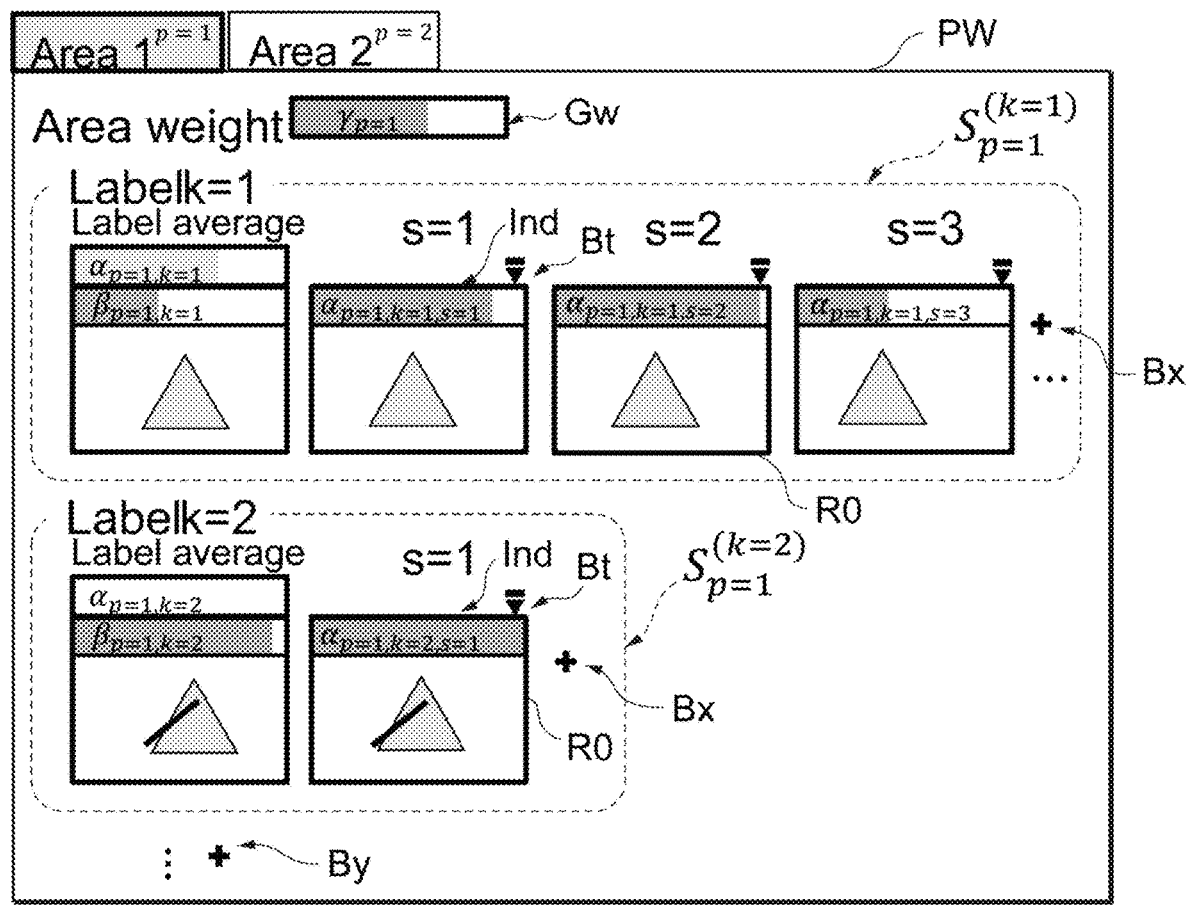

FIG. 12 is a schematic plan view illustrating another example of the display screen of the user interface in an example of the inspection device according to the embodiment of the present disclosure.

Figure 13:
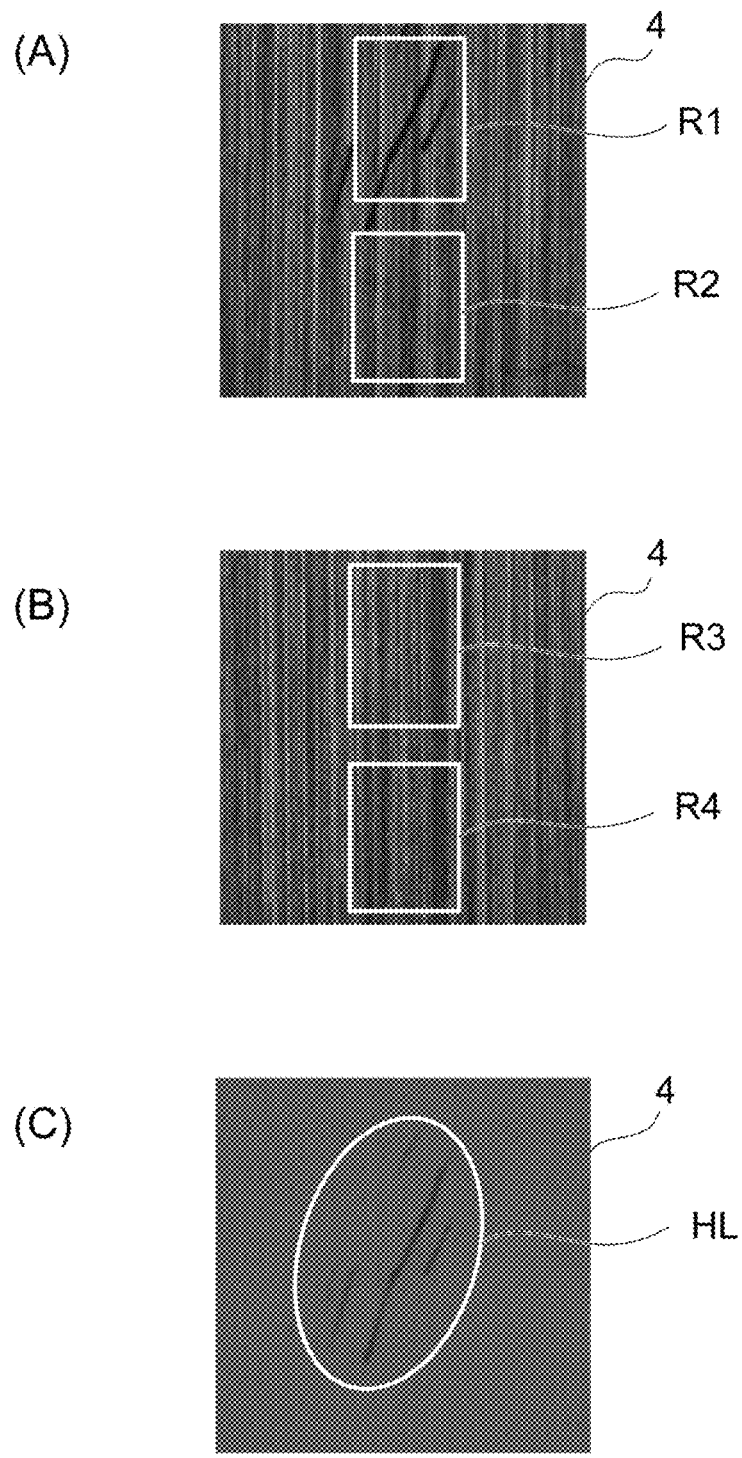

(A) of FIG. 13 to (C) of FIG. 13 are photographs (reconstructed images) illustrating an example of an illumination optimization result obtained using the Fisher's linear discrimination performed by the inspection device according to the present disclosure.

Figure 14:
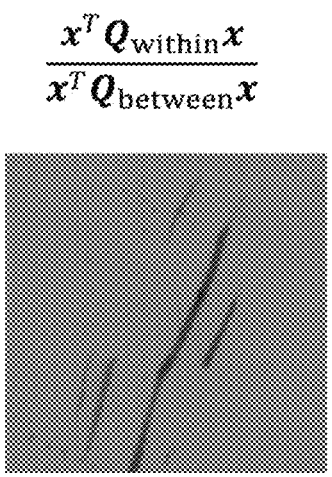

FIG. 14 is a photograph illustrating an example of an illumination optimization result obtained through the Fisher's linear discrimination using an evaluation function of a ratio type (db/Dw) in the inspection device according to the present disclosure.

Figure 15:
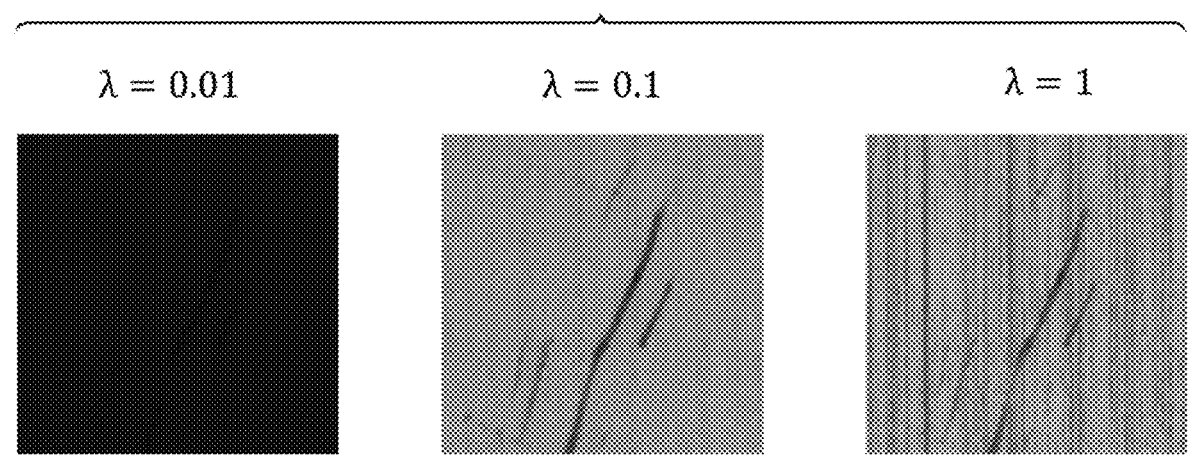

FIG. 15 is a photograph illustrating an example of an illumination optimization result obtained through the Fisher's linear discrimination using an evaluation function of a difference type (db−λ·Dw) in the inspection device according to the present disclosure.

Figure 16:
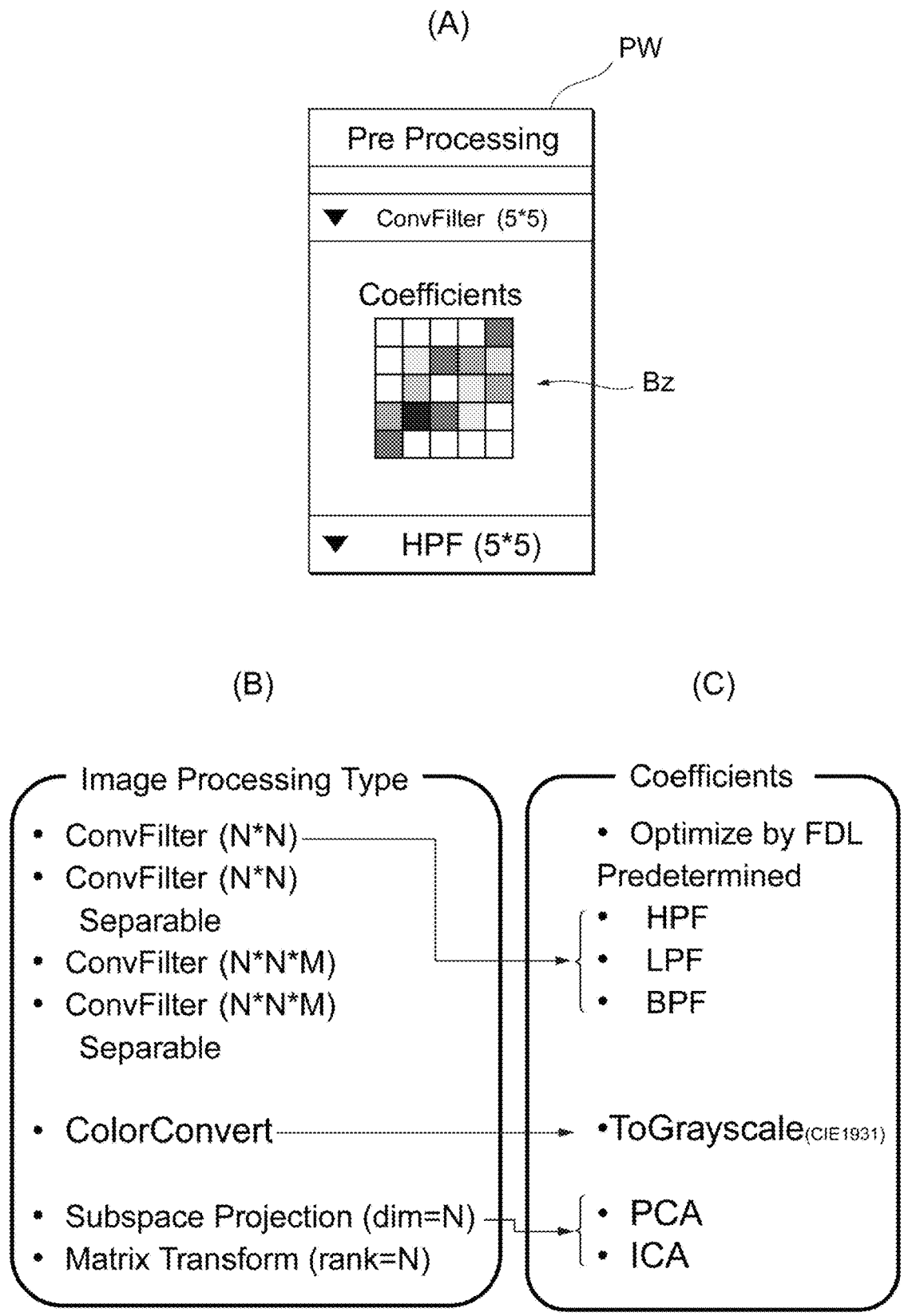

(A) of FIG. 16 to (C) of FIG. 16 are schematic plan views illustrating examples of the display screen of the user interface according to the sixth modification example and the seventh modification example.

Figure 17:
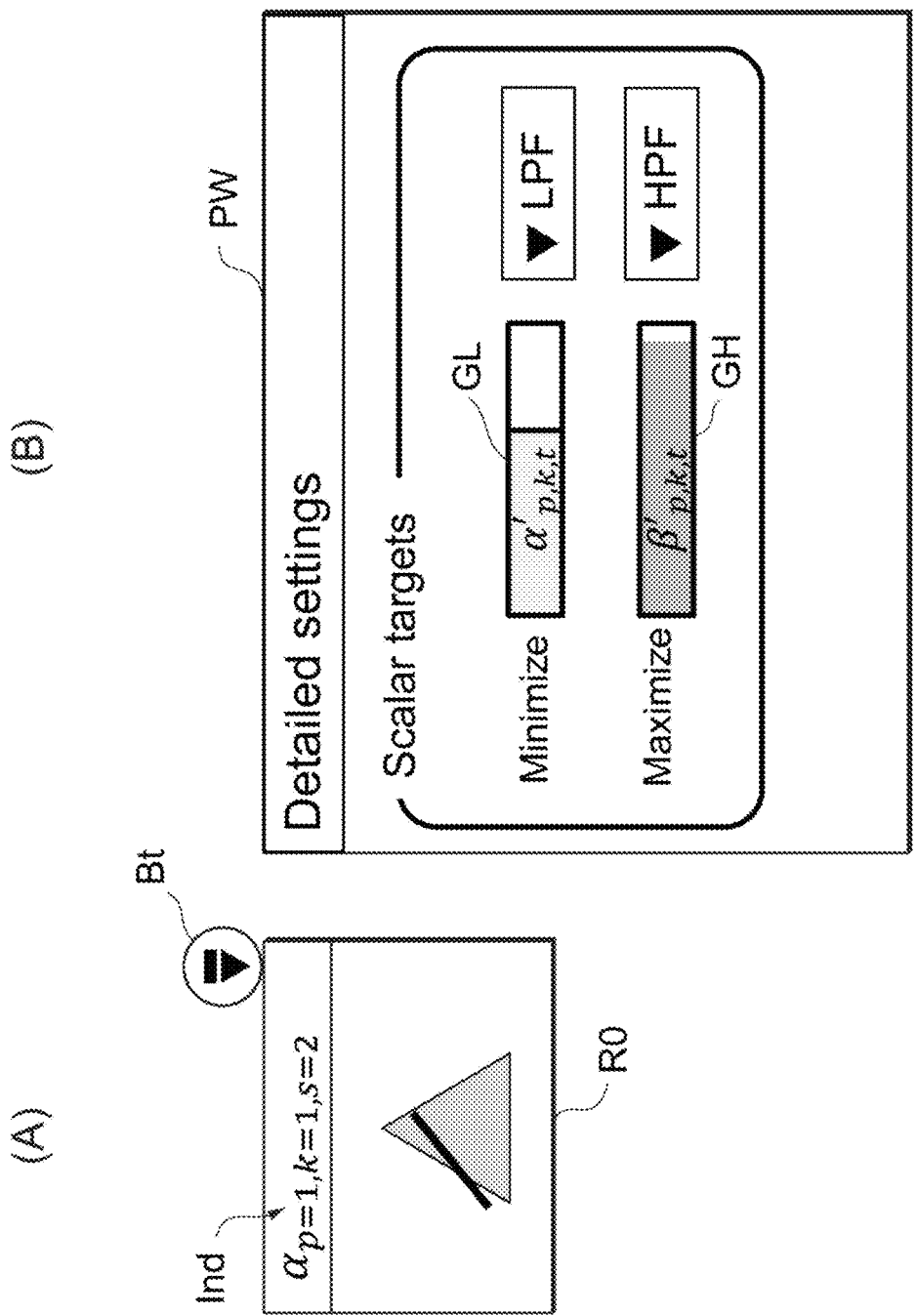

(A) of FIG. 17 and (B) of FIG. 17 are schematic plan views illustrating examples of the display screen of the user interface according to an eighth modification example.

Figure 18:
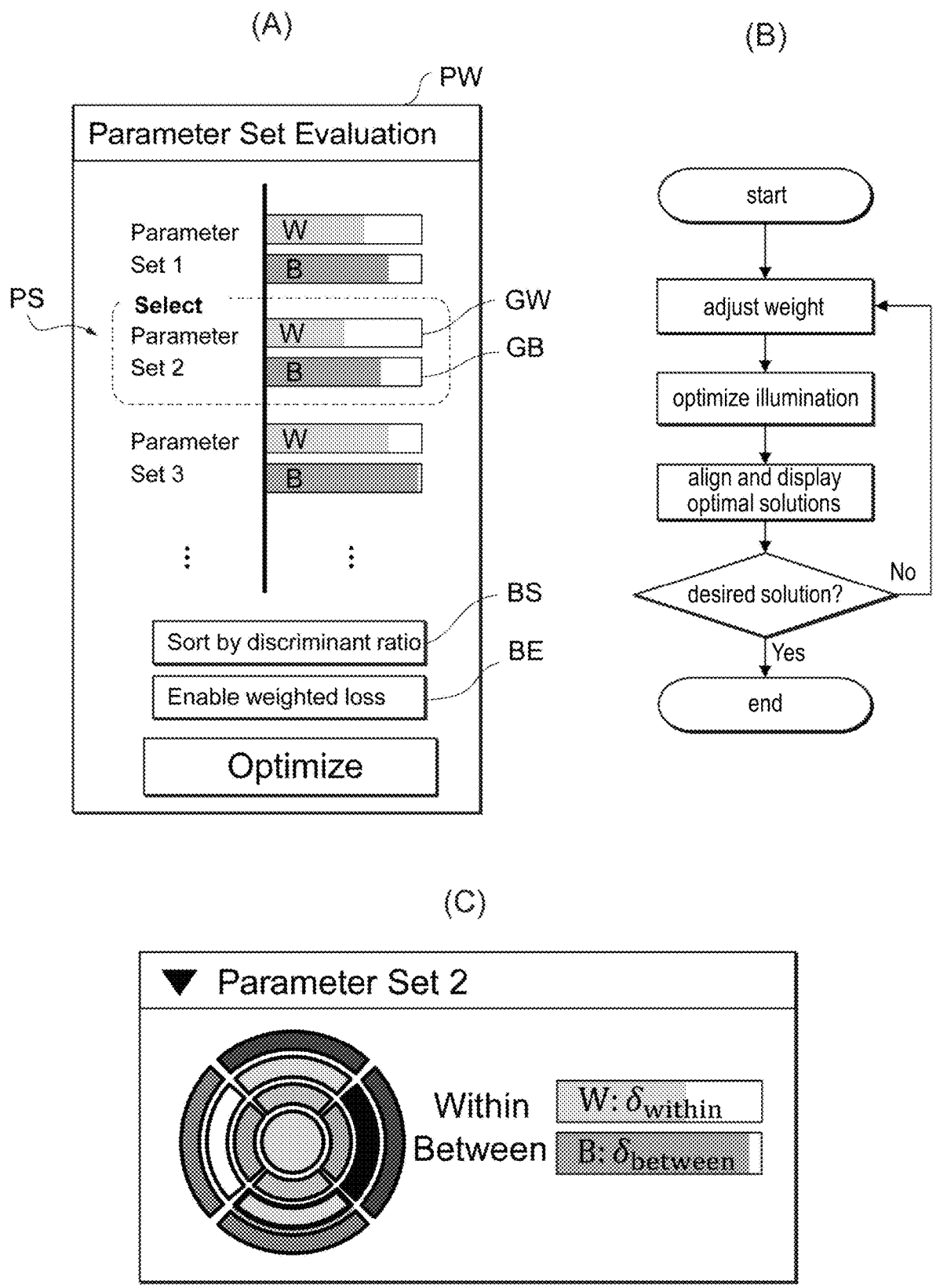

(A) of FIG. 18 illustrates an example of a pop-up window PW for displaying a result of setting a weight ($\delta_{between}$) of a first index db and a weight ($\delta_{within}$) of a second index Dw, which are evaluation criteria, and performing illumination optimization according to a ninth modification example. (B) of FIG. 18 is a flowchart illustrating an example of a processing procedure according to the ninth modification example, and (C) of FIG. 18 is a schematic plan view illustrating an example of a result selected in the ninth modification example.

Figure 19:
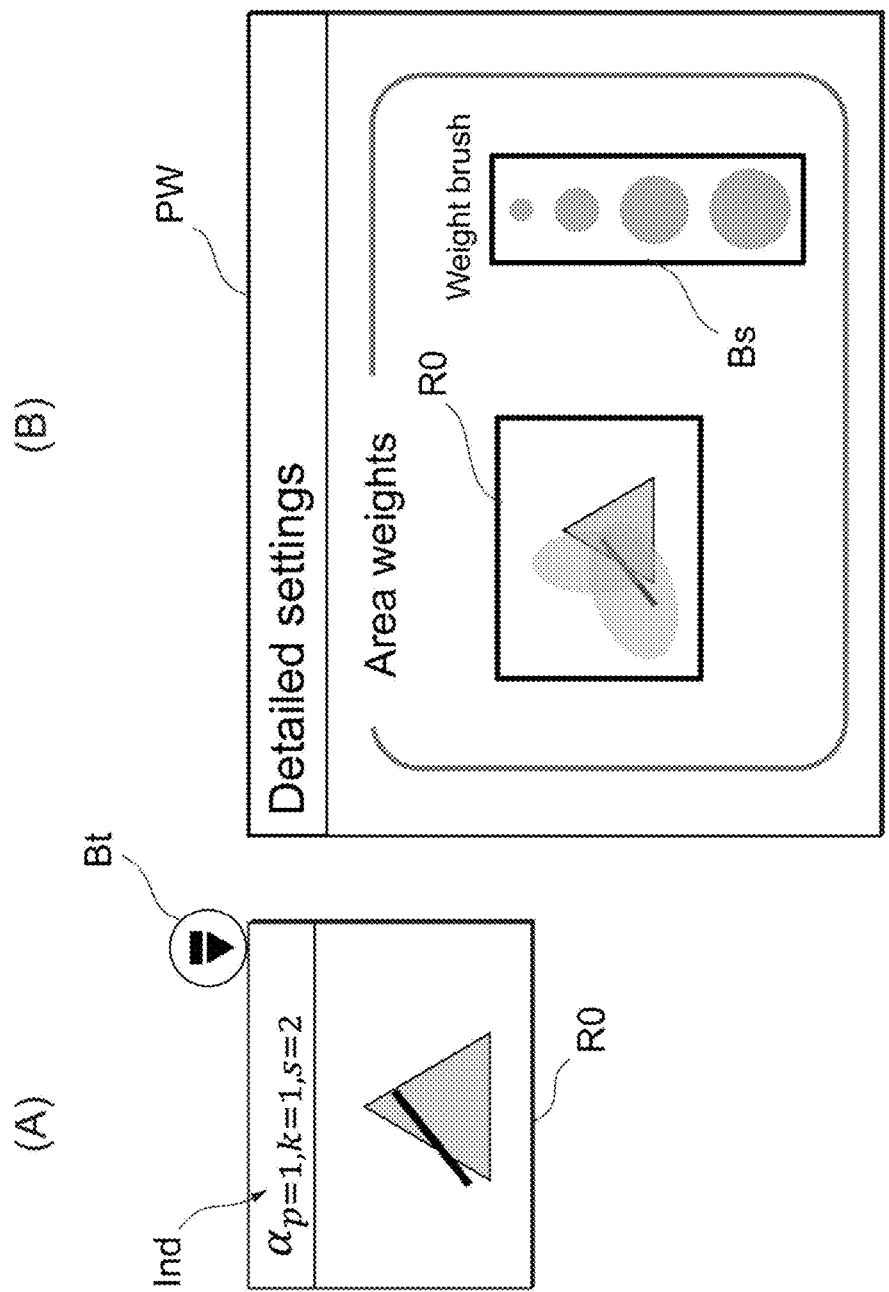

(A) of FIG. 19 and (B) of FIG. 19 are schematic plan views illustrating examples of the display screen of the user interface according to a tenth modification example.

DESCRIPTION OF EMBODIMENTS

Hereinafter, an embodiment according to an example of the present disclosure will be described with reference to drawings. However, the present embodiment described below is merely an example and is not intended to exclude applications of various modifications or techniques that will not be explicitly described below. In other words, an example of the present disclosure can be performed with various modifications without departing from the gist thereof. Also, the same or similar reference signs will be applied to the same or similar components in the following description regarding drawings, and the drawings are schematically illustrated and do not necessarily conform to actual dimensions, ratios, and the like. Further, mutual relationships and ratios of dimensions in the drawings may be included. Also, it is a matter of course that the present embodiment described below is a part of embodiments of the present disclosure and is not all the embodiments thereof. Further, all other embodiments obtained by those skilled in the art with no need of creative actions are included in the protection scope of the present disclosure on the basis of the present embodiment of the present disclosure.

§ 1 APPLICATION EXAMPLE

In the present disclosure, a workpiece to be inspected (product to be inspected) is illuminated with a light source that has variable illumination light emission parameters and has desired illumination light emission patterns, and the workpiece is imaged with an appropriate sensor to acquire an inspection workpiece image. Then, inspection of the workpiece (for example, label determination depending on whether or not there are any defects such as scratches) is performed through image processing on the inspection workpiece image. The illumination light emission parameters include, for example, a light emission position, a light emission intensity, and a chromaticity of the light source and can be represented as a single vector or a plurality of vectors (matrix). Also, the illumination light emission pattern in the inspection is optimized prior to the acquisition of the inspection workpiece image.

In the optimization, a workpiece for evaluation illuminated with each of a plurality of predetermined illumination light emission patterns of the light source is imaged to obtain a plurality of (patterns of) evaluation workpiece images (sample images). Then, for a combination of a plurality of different labels (classes, categories) and at least one region of interest (RIO) with a predetermined shape, images in the region of interest in a plurality of evaluation workpiece images are extracted to set image areas (or a group thereof).

Then, a first index indicating variations in workpieces belonging to different labels (for examples, variations between non-defective products and defective products) is set from the image areas on the basis of varying components in images belonging to the different labels. Also, a second index indicating variations in workpieces belonging to the same label (for example, variations in a non-defective product or variations in individual products) is set from the image areas on the basis of varying components in images belonging to the same label. Next, as illumination optimization, an illumination parameter vector as an optimized solution that maximizes the first index when at least one workpiece is illuminated and imaged in an illumination light emission pattern for evaluation corresponding to an arbitrary combination of a plurality of predetermined illumination light emission patterns and minimizes the second index is obtained. Then, the workpiece to be inspected is inspected using an optimized illumination light emission pattern obtained on the basis of the illumination parameter vector.

Figure 1A:
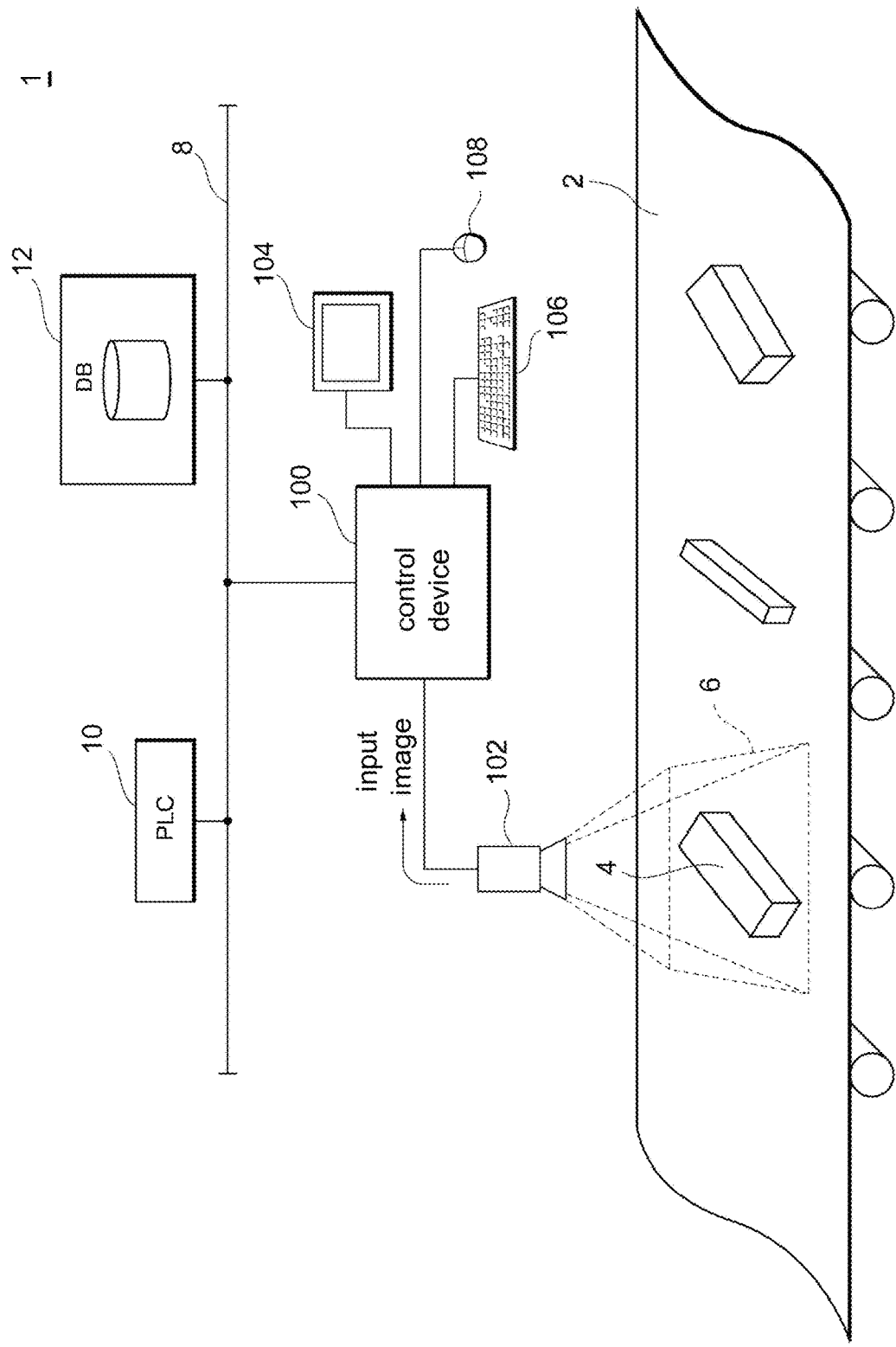
FIG. 1A is a plan view (partial perspective view) schematically illustrating an example (system configuration example) of an application situation of an inspection device according to an embodiment of the present disclosure.
Figure 1B:
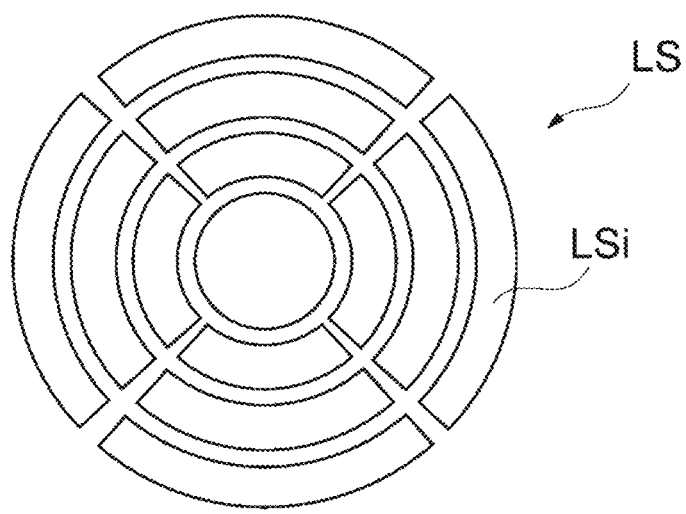
FIG. 1B is a plan view schematically illustrating an example of disposition of a light source used in the inspection device according to the embodiment of the present disclosure.

Here, an example of a situation to which an example of the present disclosure is applied will be described using FIGS. 1A and 1B, first. FIG. 1A is a plan view (partial perspective view) schematically illustrating an example (system configuration example) of a situation to which the inspection device according to an embodiment of the present disclosure is applied. Also, FIG. 1B is a plan view schematically illustrating an example of disposition of a light source used in the inspection device according to the present embodiment of the present disclosure.

An inspection system 1 performs appearance inspection of a workpiece 4 through execution of image analysis processing on an input image obtained by imaging the workpiece 4 that is transported on a belt conveyor 2 and that is to be inspected, for example. Although as a typical example of the image analysis processing, inspection regarding whether or not there are defects on the surface of the workpiece 4 will be described as an application example, the present disclosure is not limited thereto and can be applied to identification of types of defects or measurement of outer shapes, for example.

A camera 102 that serves as a sensor including a light source LS integrated therewith is disposed above the belt conveyor 2 and is configured such that an imaging field of view 6 of the camera 102 includes a predetermined area on the belt conveyor 2. Here, a multi-channel illumination such as a multi-direction multi-color (MDMC) illumination, for example, is exemplified as the light source LS, and more specifically, it is possible to exemplify the illumination described in Japanese Patent Application No. 2018-031747 of the present applicant, for example. The light source LS that is a multi-channel illumination has a plurality of channel illuminations LSi. More specifically, as illustrated in FIG. 1B, the light source LS has one channel illumination LSi with a circular shape in a plan view and twelve channel illuminations LSi that form a fan shape disposed coaxially around the one channel illumination LSi. In this case, the light source LS is configured of a total of thirteen channel illuminations LSi, and in a case in which each of the channel illuminations LSi emits light of three colors, 13×3=39 predetermined illumination light emission patterns of a single color and a single channel are obtained. Further, data of evaluation workpiece images generated through imaging performed by the camera 102 is transmitted to a control device 100. The imaging performed by the camera 102 is executed periodically or as an event.

The control device 100 controls the illumination light emission patterns of the light source LS on the basis of predetermined illumination parameters and calculates an optimized illumination light emission pattern for inspecting the workpiece 4 to be inspected, using the evaluation workpiece images and the illumination light emission pattern for evaluation. Also, the control device 100 includes a learning machine that has a convolutional neural network (CNN) engine for appearance inspection of the workpiece 4. A feature detection image for each class is generated from the input image using the CNN engine. Whether or not there are defects in the workpiece 4 to be inspected (label determination) is determined on the basis of the generated one or a plurality of feature detection images, or it is also possible to detect the sizes, the positions, and the like of the defects.

The control device 100 is connected to a programmable controller (PLC) 10, a database device 12, and the like via an upper network 8. Arithmetic operation results and detection results obtained by the control device 100 may be transmitted to the PLC 10 and/or the database device 12. Note that in addition to the PLC 10 and the database device 12, arbitrary devices may be connected to the upper network 8. Also, a display 104 that serves as an output unit for displaying a state during processing, detection results, and the like and a keyboard 106 and a mouse 108, for example, that serve as input units for receiving user's operations may be connected to the control device 100.

§ 2 CONFIGURATION EXAMPLE

Configuration Example

Figure 2:
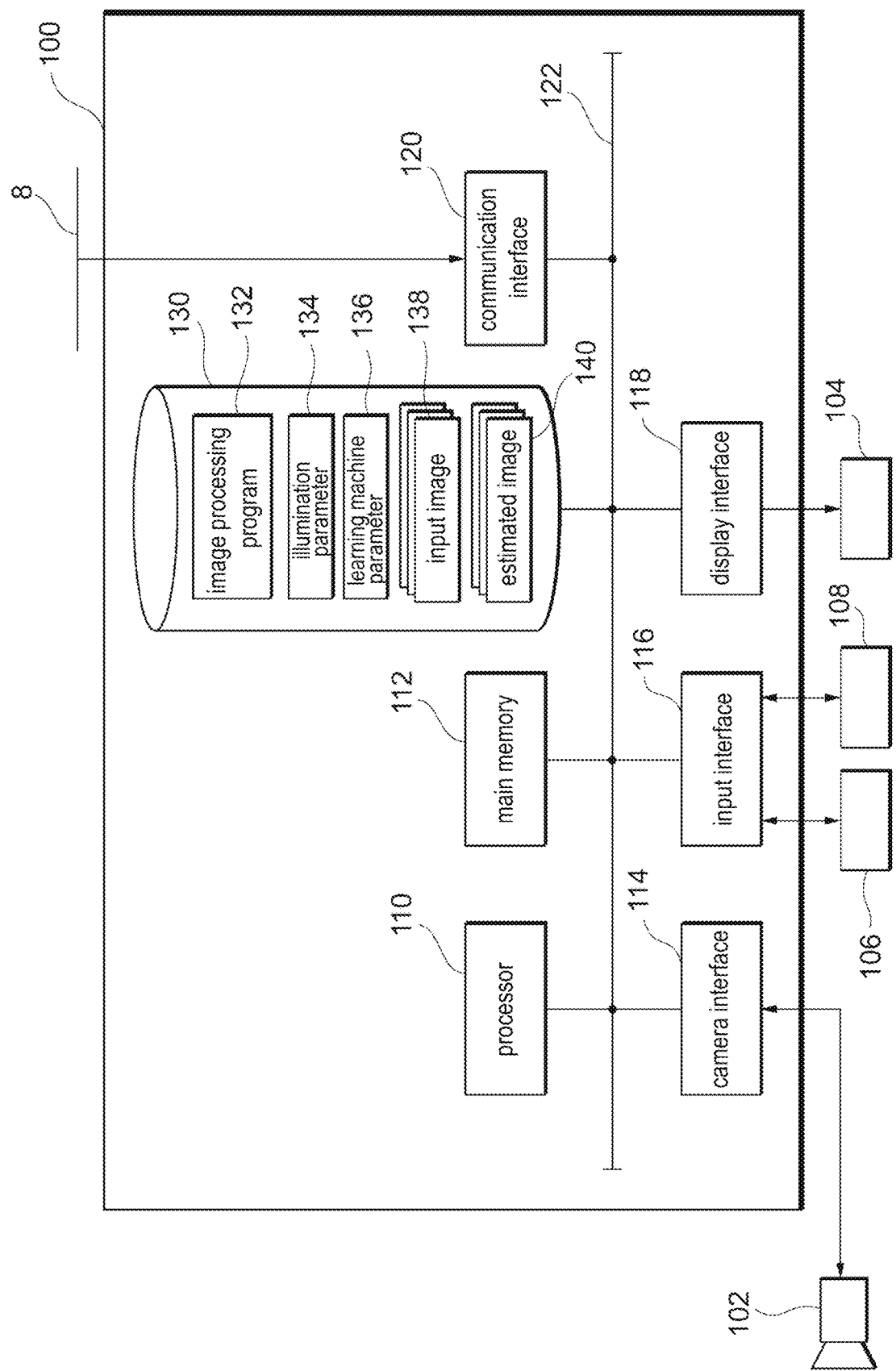
FIG. 2 is a plan view schematically illustrating a hardware configuration of a control device included in the inspection device according to the embodiment of the present disclosure.

Next, an example of a hardware configuration of the control device 100 included in the inspection system 1 that is an inspection device according to an embodiment of the present disclosure will be described using FIG. 2. FIG. 2 is a plan view schematically illustrating the hardware configuration of the control device 100.

The control device 100 may be realized using a general-purpose computer configured in accordance with a general-purpose computer architecture in one example. The control device 100 includes a processor 110, a main memory 112, a camera interface 114, an input interface 116, a display interface 118, a communication interface 120, and a storage 130. These components are typically connected via an internal bus 122 such that the components can communicate with each other.

The processor 110 realizes functions and processing, which will be described later, by developing and executing, in the main memory 112, various programs stored in the storage 130. The main memory 112 is configured of a volatile memory and functions as a work memory needed by the processor 110 to execute programs.

The camera interface 114 is connected to the camera 102 and acquires an input image 138 captured by the camera 102. The camera interface 114 may provide an instruction for an imaging timing or the like to the camera 102.

The input interface 116 is connected to the input units such as the keyboard 106 and the mouse 108 and acquires commands indicating operations and the like performed by the user on the input units.

The display interface 118 outputs, to the display 104, various processing results generated by the processor 110 through execution of programs.

The communication interface 120 is in charge of processing for communication with the PLC 10, the database device 12, and the like via the upper network 8.

The storage 130 stores programs for causing a computer to function as the control device 100, such as a program for various kinds of processing (illumination optimization and image processing) 132 including an operating system (OS). The storage 130 may further store illumination parameters 134 for realizing the illumination optimization processing, a learning machine parameter 136 for realizing the image processing, the input image 138 acquired from the camera 102, and an estimated image 140 that is a measurement result obtained from the input image 138. The illumination parameters 134 can include, for example, predetermined illumination light emission patterns of the light source LS used in an illumination optimization stage (in a case of MDMC illumination, a plurality of illumination light emission patterns with a basic intensity of each channel illumination LSi of the light source LS), an illumination pattern for evaluation, an illumination parameter vector and an illumination parameter matrix corresponding to the optimized illumination light emission pattern for inspection, and the like. Also, the learning machine parameters 136 can include illumination parameters, inspection algorithm parameters, and the like used by various machine learning models in a learning stage and an inspection stage, for example.

The program for various kinds of processing 132 stored in the storage 130 may be installed in the control device 100 via an optical recording medium such as a digital versatile disc (DVD) or a semiconductor recording medium such as a universal serial bus (USB) memory. Alternatively, the program for various kinds of processing 132 may be downloaded from a server device or the like on a network.

In such a case in which a general-purpose computer is used for implementation, some of the functions according to the present embodiment may be realized by calling and performing necessary software modules from among software modules provided by the OS in a predetermined order and/or at a predetermined timing. In other words, the program for various kinds of processing 132 according to the present embodiment may not include all the software modules for realizing the functions according to the present embodiment and may provide necessary functions in cooperation with the OS.

Also, the program for various kinds of processing 132 may be provided while being incorporated in another program as a part thereof. In such a case, the program for various kinds of processing 132 itself does not include a module included in another program that can be combined therewith as described above, and processing is executed in cooperation with that other program. In this manner, a form in which the program for various kinds of processing 132 according to the present embodiment is incorporated in another program may employed.

Note that although FIG. 2 illustrates the example in which the control device 100 is realized using a general-purpose computer, the present disclosure is not limited thereto, and all or some functions thereof may be realized using a dedicated circuit (for example, an application specific integrated circuit (ASIC) or a field programmable gate array (FPGA)). Further, an external device connected to the network may be caused to be in charge of a part of the processing.

As described above, the inspection system 1 corresponds to an example of the "inspection device" according to the present disclosure in terms of the hardware configuration. Also, the workpiece 4 corresponds to an example of the "workpiece" according to the present disclosure. Further, the light source LS corresponds to an example of the "light source" according to the present disclosure, and the camera 102 corresponds to an example of the "sensor" according to the present disclosure.

[Functional Configuration]

Figure 3:
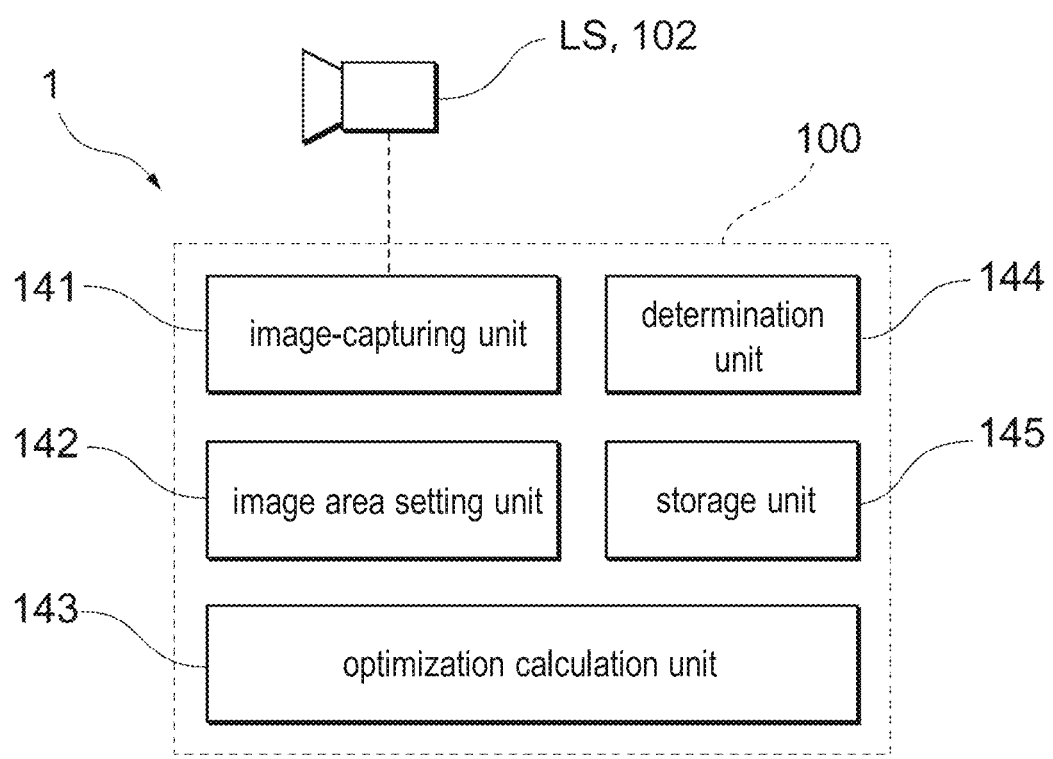
FIG. 3 is a plan view schematically illustrating an example of a functional configuration of the inspection device according to the embodiment of the present disclosure.

Next, an example of a functional configuration of the inspection system 1 that is the inspection device according to an embodiment of the present disclosure will be described using FIG. 3. FIG. 3 is a plan view schematically illustrating an example of the functional configuration (functional module) of the inspection system 1. As illustrated in FIG. 3, the control device 100 of the inspection system 1 can include an image-capturing unit 141, an image area setting unit 142, an optimization calculation unit 143, a determination unit 144, and a storage unit 145.

The image-capturing unit 141, the image area setting unit 142, the optimization calculation unit 143, and the determination unit 144 in the control device 100 can be realized by a general-purpose processor but are not limited thereto in the present disclosure, and some or all functions of these components may be realized using a dedicated circuit (for example, an application specific integrated circuit (ASIC) or a field programmable gate array (FPGA)). Further, an external device connected to the network may be caused to be in charge of a part of processing.

The image-capturing unit 141 illuminates and images at least one workpiece 4 including a workpiece 4 that has an area corresponding to a plurality of different labels (classes, categories) in a plurality of predetermined illumination light emission patterns with the light source LS and the camera 102 in the illumination optimization stage (teaching phase). Also, the image-capturing unit 141 illuminates and images the workpiece to be inspected in an optimized illumination light emission pattern with the light source LS and the camera 102 in the learning stage and the inspection stage.

The image area setting unit 142 extracts, for a combination of a plurality of different labels and at least one region of interest with a predetermined shape (for example, a rectangular shape, a circular shape, or an oval shape), images in the region of interest (ROI) in a plurality of evaluation workpiece images (input images 138 for evaluation) and sets them as image areas for evaluation, in the illumination optimization stage.

The optimization calculation unit 143 sets the first index indicating variations in workpieces belonging to different labels on the basis of varying components (for example, differences or dispersion) in images belonging to the different labels (classes) from the image areas. Also, the optimization calculation unit 143 sets the second index indicating variations in workpieces belonging to the same label on the basis of varying components in images belonging to the same label from the image areas. Then, the optimization calculation unit 143 obtains an illumination parameter vector as an optimized solution that maximizes (an evaluation value of) the first index when at least one workpiece is illuminated and imaged in an illumination light emission pattern for evaluation corresponding to an arbitrary combination of a plurality of predetermined illumination light emission patterns of the light source LS and minimizes (an evaluation value of) the second index. Then, an optimized illumination light emission pattern is calculated on the basis of the illumination parameter vector.

The determination unit 144 determines a label of the workpiece to be inspected through image processing of the inspection workpiece image (the input image 138 for inspection) obtained by the image-capturing unit 141 and the estimated image 140 in the inspection stage. Note that the determination unit 144 can perform inspection of the workpiece 4 on the belt conveyor 2 using a trained machine learning model, for example, and outputs a final inspection result related to the workpiece 4. In a case in which a learning machine used for learning is a convolutional neural network (CNN) that generates features extracted from an image, for example, the determination unit 144 can include a determination machine that generates a final inspection result through an application of determination criteria to the features extracted by the learning machine.

The storage unit 145 stores a plurality of evaluation workpiece images (input images 138 for evaluation) which associated with the predetermined illumination light emission patterns and the workpiece 4 and which are obtained by the image-capturing unit 141 in the illumination optimization stage and the inspection workpiece image (input image 138 for inspection) obtained by the image-capturing unit 141 in the learning stage and the inspection stage. Also, the storage unit 145 stores various arithmetic operation parameters obtained in arithmetic operation processing performed by the optimization calculation unit 143 and the optimized illumination parameter vector for inspection. Further, the storage unit 145 is realized by the aforementioned storage 130 that stores programs or data necessary for operations of the inspection system 1. Note that the control device 100 may not include the storage unit 145 and may use an external (device) storage instead of the storage unit 145.

As described above, the control device 100 corresponds to an example of the "image-capturing unit" according to the present disclosure along with the light source LS and the camera 102, in terms of a functional module. Also, the control device 100 functions as an example of the "image area setting unit", the "optimization calculation unit", and the "determination unit" according to the present disclosure.

§ 3 OPERATION EXAMPLE (EVALUATION CRITERIA FOR ILLUMINATION OPTIMIZATION)

Here, an overview of importance of illumination optimization and evaluation criteria thereof will be described, and then a specific processing procedure will be described with reference to drawings and the like. First, a purpose of illumination design in an appearance inspection of a workpiece and the like is to allow accurate discrimination between non-defective products (normal products) and defective products (products with defects). Although this problem is solved by manual operations of skilled persons in the related art, it is necessary to determine and limit "determination criteria" and "a degree of freedom in control of illumination design" in advance in order to systematically solve the problem.

Here, an illumination optimization problem in a case in which a prescribed discrimination algorithm is provided as a determination criterion and a multi-channel illumination such as MDMC illumination is provided as a degree of freedom in control is formulated as a "cross entropy minimization problem" that causes categorization between non-defective products and defective products to conform to a correct answer. Note that in a case in which a discrimination machine in the label determination of the workpiece is a machine learning machine, it is also possible to perform the illumination optimization and the learning performed by the discrimination machine at the same time and to cause tuning for exhibiting the best performance in both the illumination optimization and the learning to be automatically performed.

However, what becomes a big problem when cross entropy minimization is to be performed is that a large number of samples with the non-defective product/defective product labels applied thereto are needed. In a case in which illumination with a particularly large degree of freedom is to be optimized, it is difficult to uniquely determine optimal illumination with criterion that a small number of non-defective product/defective product labels are merely distinguished. Such a problem is a big problem that is to be considered at the time of activating an inspection device with which many evaluation workpiece images (sample images) cannot be obtained, in particular.

Thus, the present disclosure will propose a method for optimizing illumination on the basis of evaluation criteria (contrast, brightness, closeness) of an image itself in order to solve the problem. In this case, it is possible to roughly exemplify the following two requirements as requirements required for optimized illumination design in the appearance inspection of a workpiece or the like.

[Requirement 1] To cause features to be easily recognizable for easy identification of a non-defective product (label) and a defective product (label) (that is, to cause defects to be easily recognized)

[Requirement 2] To cause variations in a non-defective product (variations in individual products) to be less easily recognizable However, since both the requirements are typically conflicting characteristics, performing of illumination design with a balance therebetween is a difficult problem in the illumination optimization. In order to quantitatively examine such a requirement here, a difference in images between non-defective products and defective products will be described as db (first index: variations between non-defective products and defective products), and a difference in images of a non-defective product will be described as Dw (second index: variations in a non-defective product). Although these may be defined using arbitrary evaluation criteria, a quadratic function is used in the embodiment and modification examples of the present disclosure (that is, variations will be defined as dispersion). In the illumination design that satisfy both the aforementioned requirements, it is necessary to solve an optimization problem that increases the value of db and decreases the value of Dw at the same time. In this case, although it is necessary to determine a balance therebetween in order to optimize the two evaluation functions db and Dw at the same time, an example in which evaluation expressions of a ratio type (db/Dw) and a difference type (db−λ·Dw) are used will be described in the present disclosure.

Note that if a definition that it is preferable to increase the value of db and to decrease the value of Dw is employed, arbitrary evaluation criteria may be used. In a case in which the ratio type (db/Dw) is used, there is a feature that no problem occurs in optimization even if a difference between the values of db and Dw is large to some extent. Note that there may be a case in which an absolute value of an illumination intensity is not fixed and a standardized solution is obtained due to the ratio type. On the other hand, in a case of the difference type (db−λ·Dw), a problem for determining an absolute value of the solution is easily handled. Note that in a case in which the difference between the values of db and Dw is large to some extent, it is possible to address the problem by introducing a parameter (λ) for adjustment to achieve a balance therebetween.

Further, although it is necessary to obtain a solution of the optimization problem under a restriction condition that a light emission intensity of illumination (an intensity of each channel of the multi-channel illumination) is a non-negative value regardless of which evaluation criteria is to be used, this is typically difficult. Generally, it is possible to obtain the solution at a high speed if a secondary planning method or the like is used in a case of a convex quadratic function. However, even if both db and Dw are simple convex quadratic functions, a quadratic coefficient is not a positive definite if a difference therebetween is used, and a so-called nonconvex quadratic programming (QP) problem occurs. Similarly, a so-called nonconvex quadratically constrained quadratic programming (QCQP) problem occurs in a case in which the evaluation function of the ratio type is used. In order to solve these optimization problems, an optimization method based on semidefinite programming (SDP) will be referred to in the embodiment of the present disclosure.

Note that meanings of each sign used in expressions in the following description of the embodiment and each modification example are as shown in Table 1. Bold lowercases represent vectors, and bold uppercases represent matrixes (these will be described in a non-bold manner in the sentences). The other signs are scalars.

| Meaning | Sign |
|---|---|
| Number of channels in multi-channel illumination | L |
| Number of workpiece images captured with illumination light emission pattern for evaluation (for teaching) changed | N |
| Number of comparison target groups in region of interest (ROI) | P |
| Number of labels (classes, categories) | K |
| Number of images captured in multi-shot inspection | M |
| Illumination light emission pattern for evaluation (teaching) | $h_i$ ($1 \le i \le N$) H (horizontally aligned) |
| Workpiece captured image at $h_i$ | $f_i$ ($1 \le i \le N$) f (vertically aligned) |
| Group of f | $S_p^{(k)}$ |
| Matrix expression of linear image processing in inspection stage | B |
| Image synthesis weight (single shot) | $x_i$ ($1 \le i \le N$) x (aligned in a vertical vector) |
| Image synthesis weight (multiple shots) (* expressed as W to avoid confusion with X) | $w_{i,j}$ ($1 \le i \le N, 1 \le j \le M$) W (aligned in a matrix) |
| Optimization variable of SDP | X |
| Optimized illumination intensity to be finally obtained (single shot) | $u_i$ ($1 \le i \le L$) u (aligned in a vertical vector) |
| Optimized illumination intensity to be finally obtained (multiple shots) | $u_i$ ($1 \le i \le M$) U (horizontally aligned) |

(Equivalency of Imaging in Multi-Channel Illumination and Inner Product Arithmetic Operation)

Although the image-capturing unit 141 using a multi-channel illumination as the light source LS is used in the inspection system 1 according to the present disclosure, it is assumed here linearity of the inspection system 1 on the side of the sensor (linearity between luminance and a QL value) is established. This means that linearity is established in a system including all kinds of image correction such as signal processing including color filter demosaicing, gamma correction, and dark current offset correction. In order to avoid non-linearity due to pixel saturation, high dynamic range (HDR) synthesis or the like may be used to capture an image. At this time, a light emission intensity of each channel illumination is denoted as a vector in Expression (1) below in consideration of a situation in which a workpiece 4 illuminated with L channel illuminations LSi is imaged.

[Math. 1]

$$u=(u_1, u_2, \ldots u_L)^T, u_i \ge 0 \quad (1)$$

At this time, if an image obtained by aligning, as column vectors, images that are captured with only i-th illumination turned on with a predetermined intensity as represented by Expression (2) described below and with the other illuminations turned off is defined as fi, a captured image g under an arbitrary illumination condition u can be modeled through image synthesis as represented by Expression (3) described below.

[Math. 2]

$$u_i=1, u_j=0 (j \ne i) \quad (2)$$

$$g = \Sigma_{i=1}^L u_i f_i = Af \quad (3)$$

Here, each of A and f is a multi-channel image (one large column vector; Expression (5)) in which a projection matrix defined by Expression (4) described below and N images are vertically aligned.

[Math. 3]

$$A = u^T \otimes I \quad (4)$$

$$f = \Sigma_{i=1}^L e_i \otimes f_i \quad (5)$$

Also, each operator in the above expressions is as follows.

[Math. 4]

$\otimes$: indicates a Kronecker product
$e_i$: indicates a standard basis of $\mathbb{R}^{L_i}$
I: indicates a unit matrix.

Figure 4:
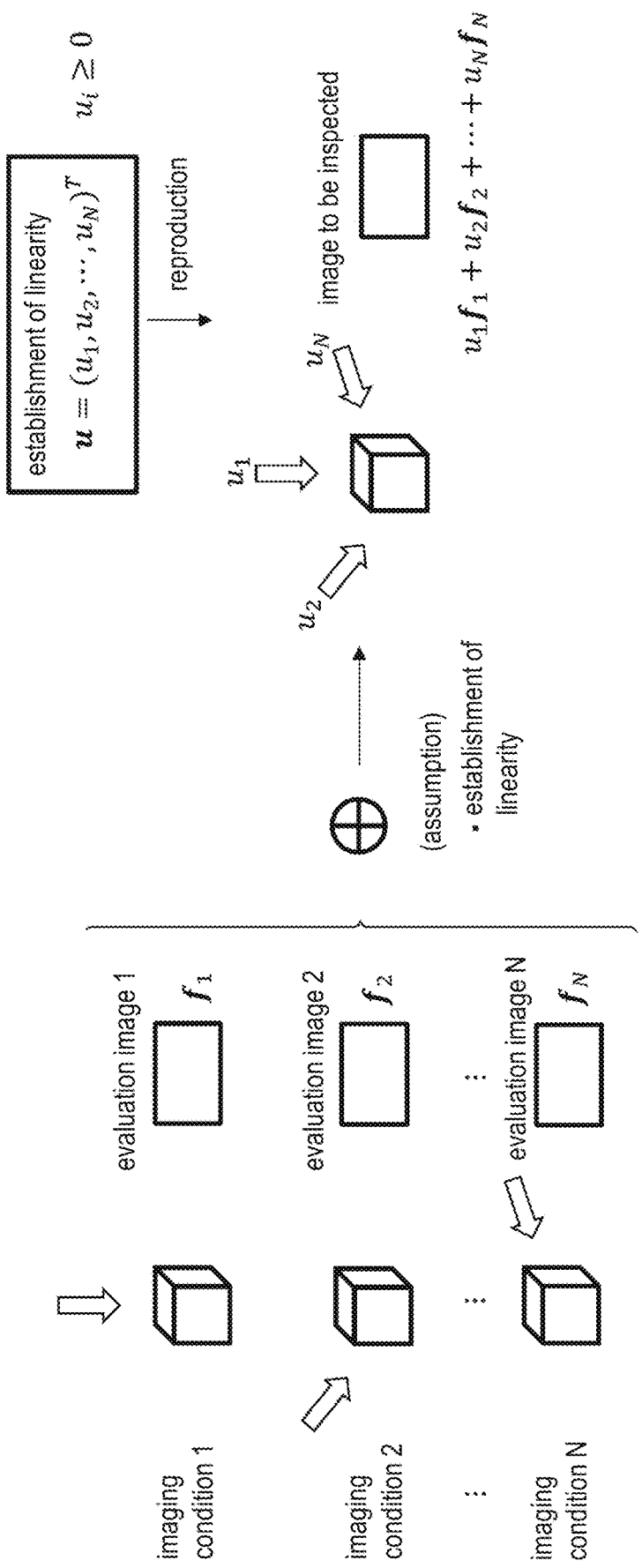
FIG. 4 is a schematic view illustrating an image synthesis model on the assumption of establishment of linearity in single-shot inspection using multi-channel illumination according to the present disclosure.
Figure 5:
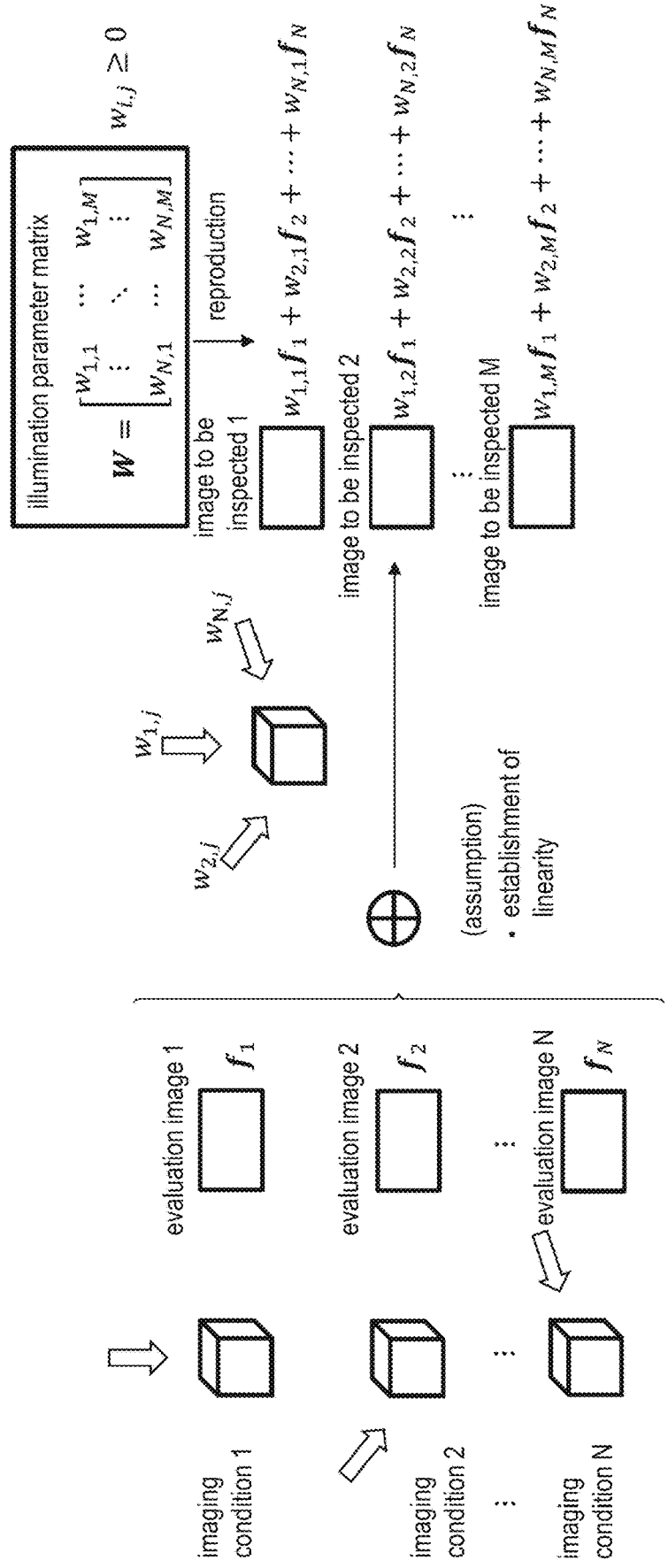
FIG. 5 is a schematic view illustrating an image synthesis model on the assumption of establishment of linearity in multi-shot inspection using multi-channel illumination according to the present disclosure.

In this manner, optimization of multi-channel illumination is equivalent to generation of the feature vector g in an inner product arithmetic operation from an original image f, that is, optimal design in a linear projection direction u in the projection matrix A. Here, FIGS. 4 and 5 are schematic views illustrating an image synthesis model on the assumption of establishment of linearity in single-shot inspection and multi-shot inspection using the multi-channel illumination according to the present disclosure.

Next, an example of an inspection method including an illumination optimization method according to an embodiment of the present disclosure will be described with reference to (A) of FIG. 6 and (B) of FIG. 6. (A) of FIG. 6 and (B) of FIG. 6 are flowcharts illustrating an example of processing procedures in the illumination optimization stage and the inspection stage according to the embodiment of the present disclosure. Note that the processing procedures described below are merely examples, and the processing may be changed as long as possible within the scope of the technical idea of the present disclosure. In the processing procedures described below, omission, replacement, and addition of steps can be appropriately made in accordance with the embodiment and each configuration example.

(Step S410)

In Step S410 (imaging step), the camera 102 and the image-capturing unit 141 illuminate and image (C) workpieces 4 for evaluation in each of a plurality of predetermined illumination light emission patterns (N patterns) to acquire C×N evaluation workpiece images in an illumination optimization stage in single-shot inspection.

Here, a situation in which one workpiece 4 is imaged in N predetermined illumination light emission patterns to determine (teach) an optimal illumination light emission pattern in a situation in which L channel illuminations are mounted in a multi-channel illumination is generally considered. First, an illumination light emission pattern in n-th ($1 \leq n \leq N$) imaging is defined by Expressions (6) and (7) described below.

[Math. 5]

$$h_n = (h_{1,n}, h_{2,n}, \ldots, h_{L,n})^t, h_{i,n} \geq 0 \qquad (6)$$

$$H = [h_1, h_2, \ldots, h_N] \qquad (7)$$

It is possible to reconfigure a captured image of a workpiece in a case in which the workpiece is illuminated in an arbitrary light emission pattern by imaging the workpiece 4 in these predetermined illumination light emission pattern. This is equivalent to performing of estimation of a light transport (LT) matrix. In order to acquire all degrees of freedom of the LT matrix, it is generally desirable to determine an illumination light emission pattern to satisfy the relationship of Expression (8) described below, that is, to achieve linear independence.

[Math. 6]

$$\text{rank } H = \min(N, L) \qquad (8)$$

Here, in order to fully use all the degrees of freedom of L illuminations, at least N=L is to be satisfied, and at that time, H has to be a full rank. On the other hand, in a case in which N<L, this is an effective method for shortening an imaging time of the workpiece 4 though it is not possible to sufficiently use the degrees of freedom of the number of illuminations. Although various methods to realize this are conceivable, representative examples thereof include a method of performing LT matrix estimation using compressed sensing. On the hand, a case in which N>L is also conceivable, and this may lead to an unnecessary large number of captured images that exceed a necessary number in terms of sufficient utilization of the degrees of freedom of the illuminations. However, this can be selected for another purpose of enhancing an SN ratio or widening a dynamic range.

An image obtained by aligning, as column vectors, the evaluation workpiece images captured in these predetermined illumination light emission patterns is defined as fi, and a multi-channel image vector obtained by vertically aligning and organizing N (N patterns of) fi is defined as Expression (9) described below. This is equivalent to L=N in Expression (5) described above.

[Math. 7]

$$f = \sum_{i=1}^{N} e_i \otimes f_i \qquad (9)$$

In the above expression, each arithmetic operation is as follows.

[Math. 8]

⊗: indicates a Kronecker product
$e_i$: indicates a standard basis of $\mathbb{R}^N$ (Steps S412 and S414)

Next, in Step S412 (image area setting step), the image area setting unit 142 extracts, for a combination of a plurality of different labels and at least one region of interest (ROI) with a predetermined shape (for example, a rectangular shape, a circular shape, or an oval shape), images in the predetermined region of interest from the evaluation workpiece images acquired in Step S410 on the basis of a user's instruction, for example, and sets image areas. In Step S414 (calculation step), the optimization calculation unit 143 obtains, through discriminant analysis such as the Fisher's linear discrimination, for example, an illumination parameter vector as an optimized solution that maximizes the first index db (variations between non-defective products and defective products; how easily defects are recognizable) when the workpiece 4 is illuminated and imaged in an arbitrary illumination light emission pattern for evaluation and minimizes the second index Dw (variations in a non-defective product; variations in individual products), using image data in the image areas.

Here, (A) of FIG. 11 and (B) of FIG. 11 are schematic plan views illustrating examples of a display screen of a user interface in an example of the inspection device according to the embodiment of the present disclosure. In (A) of FIG. 11, an image in a region of interest (ROI) R0 designated by the user and an index Ind (including a weight; see the ninth modification example described below for the weight) of the region of interest R0 are displayed. In order to set the region of interest R0, it is possible to use a pop-up window PW for choosing a region of interest illustrated in (B) of FIG. 11, for example. A list of evaluation workpiece images captured in advance in the predetermined illumination light emission patterns is displayed in the pop-up window PW, and a desired evaluation workpiece image is displayed in an enlarged manner by the user performing an operation such as tapping on the image (in the illustrated example, the second workpiece image has been selected).

The user can extract a region in a desired range as the region of interest R0 by performing a tapping or pinching operation on the desired region in the enlarged display image. The image in the thus selected region of interest R0 is pop-up displayed as illustrated in (A) of FIG. 11. Also, the pop-up window PW illustrated in (B) of FIG. 11 may be displayed again through tapping of a touch button Bt displayed in (A) of FIG. 11 such that the region of interest R0 can be changed or another region of interest R0 can additionally be selected. Further, a plurality of regions of interest R0 may be selected at a time from one evaluation workpiece image. In a case in which a plurality of different regions of interest R0 are selected in the same area (same p in the index Ind), it is desirable to choose the regions such that the shapes and the sizes of the regions are the same.

(Arbitrary Illumination Light Emission Pattern)

Here, the arbitrary light emission pattern u within a range in which estimation can be made from the N evaluation workpiece images and the captured image g at that time are expressed by Expression (10) to (12) described below.

[Math. 9]

$$u = Hx, x = (x_1, x_2, \ldots, x_N)^T \qquad (10)$$

$$g = \sum_{i=1}^{N} x_i f_i = Af \qquad (11)$$

$$A = x^T \otimes I \qquad (12)$$

Here, xi denotes an image synthesis weight of the captured images in the predetermined illumination light emission patterns. Note that a command value of a light emission intensity of each channel illumination LSi in the light source LS is calculated on the basis of the weight value but is not the weight value itself. Also, although this is generally allowed to be a negative value, the condition of Expression

(13) described below is applied since the light emission intensity of illumination has to be always non-negative.

[Math. 10]

$$Hx \geq 0 \qquad (13)$$

Here, inequality signs for vectors and matrixes are assumed to be inequality signs for all elements. In a case in which H=I, that is, L=N images are captured with the channel illuminations LSi of the light source LS turned on one by one, u is equivalent to x. Therefore, it is possible to obtain the optimal illumination parameter vector u at that time by obtaining the optimal image synthesis weight x.

(Fisher's Linear Discrimination)

The Fisher's linear discrimination is a method by which it is possible to obtain a projection vector that "maximizes inter-label (class) dispersion" and "minimizes intra-label (class)". According to the Fisher's linear discrimination, an arithmetic operation for generating a feature vector is a simple inner product arithmetic operation, and the effect thereof is thus significantly limited as compared with a method of employing various linear arithmetic operations used in recent years. However, in the optimization of illumination parameters handled in the present disclosure, if imaging in the multi-channel illumination is regarded as an arithmetic operation as described above, the imaging is mathematically a simple inner product arithmetic operation and linear projection themselves. Therefore, it is possible to state that the Fisher's linear discrimination capable of obtaining optimal linear projection is effective for the illumination optimization problem of the present disclosure.

Hereinafter, a problem of defining inter-label (class, category) dispersion and intra-label dispersion by focusing on how close images are (similarity) and calculating an illumination light emission pattern of the multi-channel illumination that realizes the Fisher's linear discrimination based on the definition will be formulated. Generally, in a case in which workpieces are categorized into K labels (classes, categories), K=2 in discrimination only between non-defective products (PASS) and defective products (FAIL), for example. Indexes of the labels are assumed to meet 1≤k≤K.

Also, it is assumed that there are P (≥1) groups as comparison targets in the region of interests (ROI) of the evaluation workpiece images. The illumination optimization criteria are defined depending on how large variations in a group of images belonging to the same group are. Indexes of the comparison target groups in the region of interest are assumed to meet 1≤p≤P.

At this time, it is assumed that image areas obtained by extracting images at the portion of the region of interest from the evaluation workpiece images are provided by Expression (14) described below for each combination of k and p as described above prior to the illumination optimization.

[Math. 11]

$$S_p^{(k)} \qquad (14)$$

Also, the number C of the workpieces 4 for evaluation does not necessarily conform to the number of elements of the image areas. In other words, this is because in addition to the presence of a case in which a plurality of regions of interest are picked up from one evaluation workpiece image, which region of interest belongs to which region of interest comparison target group may be arbitrary selected and arbitrarily set by the user, and these elements thus change depending on a user's instruction.

Here, FIG. 12 is a schematic plan view illustrating another example of the display screen of the user interface in an example of the inspection device according to the present embodiment of the present disclosure and is also a diagram illustrating a state in which the image areas of Expression (14) described above are set. Note that a weight is included as the index Ind of the image in each of regions of interest R0 of the image areas, and the weight will be described in detail in the ninth modification example described below.

FIG. 12 is an example of the pop-up window PW in which an image area belonging to an index p (area) of a comparison target group is displayed in a tab form. In the illustration, an image (the image at the left end in the illustrated paper surface) in the region of interest R0 chosen by the user for each of the labels=1 and 2 (which correspond to a non-defective product label and a defective product label, respectively) belonging to an area=1 and images to each of which the user has applied a weight (index) are grouped. In the pop-up window PW in FIG. 12, the weight set for each area is also displayed, and in an image in the region of interest R0 chosen by the user, dispersions (β and α, respectively) of the first index db among labels and the second index Dw in the same label from an average are gauge-displayed. In addition, the weighted second index Dw(α) with the same label is displayed in each weighted region of interest R0. Also, an addition button Bx for the region of interest R0 (see FIG. 11 for selection of a region) is displayed beside each label in the pop-up window PW, and an addition button By for a label k is also displayed below the label.

The description will be repeated here. That is, it is assumed that N evaluation workpiece images (Expression (15) described below) used in the optimization stage (teaching) are to be captured each time by turning on the light source in accordance with (the light emission pattern for evaluation) hn in the predetermined illumination light emission pattern of each channel of the multi-channel illumination. Using these, an expectation value $D_{within}$ of an intra-label (class) distance (variations in a non-defective product) and an expectation value $D_{between}$ of an inter-label (class) distance (how easy defects are recognizable) are defined as l2 distances as in Expressions (16) and (17) described below.

[Math. 12]

$$f \in S_p^{(k)} \qquad (15)$$

$$D_{within} = \mathop{\mathbb{E}}_{k,p} Var(S_p^{(k)}, m_p^{(k)}), \; m_p^{(k)} = \mathop{\mathbb{E}}_{f \in S_p^{(k)}} f \qquad (16)$$

$$D_{between} = \mathop{\mathbb{E}}_{p} Var(S'_p, m'_p), \; S'_p = \{m_p^{(k)}\}_k, \; m'_p = \mathop{\mathbb{E}}_{k} m_p^{(k)} \qquad (17)$$

Here, Var (S, m) is calculated as represented by Expression (18) described below from a group S and an average m of the multi-channel images, and this can be expressed as a secondary form of the illumination parameter vector x. The dispersion matrix at this time will be described as Q.

[Math. 13]

$$Var(S, m) = \mathop{\mathbb{E}}_{f \in S}\left\| g - \mathop{\mathbb{E}}_{f \in S} g \right\|^2 = \mathop{\mathbb{E}}_{f \in S}\left\| A\left(f - \mathop{\mathbb{E}}_{f \in S} f\right)\right\|^2 \qquad (18)$$

$$= tr\, ARA^T = tr\, (x^T \otimes I) R (x \otimes I) = x^T Q x$$

In Expression (18) described above, the matrixes R and Q are specifically expressed as Expressions (19) and (20) described below.

[Math. 14]

$$R = \mathop{\mathbb{E}}_{f \in S}\left(f - \mathop{\mathbb{E}}_{f \in S} f\right)\left(f - \mathop{\mathbb{E}}_{f \in S} f\right)^T = \qquad (19)$$

$$\mathop{\mathbb{E}}_{f \in S} \sum_{i,j} e_i e_j^T \otimes \left(f_i - \mathop{\mathbb{E}}_{f_i} f_i\right)\left(f_j - \mathop{\mathbb{E}}_{f_j} f_j\right)^T$$

$$[Q]_{i,j} = \mathop{\mathbb{E}}_{f \in S}\left(f_j - \mathop{\mathbb{E}}_{f_j} f_j\right)^T \left(f_i - \mathop{\mathbb{E}}_{f_i} f_i\right) \qquad (20)$$

In the expansion at and after this point, the dispersion matrixes corresponding to the expectation values $D_{between}$ and $D_{within}$ are defined as dispersion matrixes $Q_{between}$ and $Q_{within}$, respectively, and an evaluation function is designed using these dispersion matrixes. Since the dispersion matrixes are in secondary forms related to the illumination parameter vector in this case unlike a typical case, the rank of Q is not necessarily 1 even if the number of intra-label samples is two, and there are almost full ranks in many cases though it depends on the configuration of the multi-channel illumination.

Then, in the Fisher's linear discriminant, x that maximizes the evaluation expression represented by Expression (21) described below corresponds to an image synthesis weight to be obtained, that is, an optimization illumination parameter in the evaluation function of the ratio type (db/Dw) in order to realize maximization of the inter-label (class) dispersion and minimization of the intra-label (class) dispersion at the same time.

[Math. 15]

$$\text{maximize} \frac{x^T Q_{between} x}{x^T Q_{within} x}, \quad \text{subject to: } \|x\|^2 = 1 \qquad (21)$$

Note that the reason that the norm of x is restricted in the above expression is because the norm becomes indefinite merely with the evaluation function. The optimal projection direction of the Fisher's linear discrimination can be obtained as a maximum eigenvector of an eigenvalue in the general eigenvalue problem by a Lagrange undetermined multiplier method. However, what is problematic in the illumination optimization is a point that the eigenvector can be a negative value. In other words, since it is not possible to actually realize a negative illumination intensity although it is only necessary to set the illumination parameter vector in the direction that follows the eigenvector, a measure for solving this point will be described in modification examples 5-2 and 5-3 described below.

Then, in Step S414, an illumination light emission pattern optimized for the inspection is calculated on the basis of the illumination parameter vector u corresponding to x that maximizes the evaluation expression (21) in the aforementioned Fisher's linear discrimination.

(Steps S420 and S422)

In Step S420, the camera 102 and the image-capturing unit 141 acquire an inspection workpiece image of a workpiece to be inspected using the illumination light emission pattern optimized for inspection in the inspection stage.

Then, in Step S422, the determination unit 144 performs label determination (for example, inspection regarding whether or not there are defects such as scratches) of the workpiece.

§ 4 EFFECTS AND ADVANTAGES

As described above, according to an example of the inspection system 1 that serves as the inspection device according to the present embodiment and the inspection method using the inspection system 1, it is possible to obtain an optimized illumination light emission pattern capable of curbing influences of variations in non-defective product or individual variations of the workpieces while emphasizing defects in workpieces. As a result, it is possible to reduce missing of defects in workpieces and determination errors and thereby to improve inspection performance and inspection efficiency of the workpieces. Also, it is possible to reduce efforts and the number of processes required to optimize an illumination parameter in the related art, thereby to improve producibility and economic efficiency, and further to contribute to saving of resources such as storage resources.

Also, since the evaluation expression based on the evaluation function of the ratio type (db/Dw) is maximized using the Fisher's linear discrimination, it is possible to directly analyze the maximization of db and the minimization of Dw and to perform optimization even if the difference between db and Dw is large to some extent. Further, since the evaluation function of the ratio type is used, it is possible to suitably obtain the optimized solution of any of the illumination parameter in the single-shot inspection and the illumination parameter in the multi-shot inspection.

Here, (A) of FIG. 13 to (C) of FIG. 13 are photographs (reconstructed images) illustrating examples of illumination optimization results using the Fisher's linear discrimination using the inspection device according to the present disclosure. (A) of FIG. 13 is an example of a comparison (db) of a region of interest R1 with a defect (scratch HL on a hairline) and a region of interest R2 with no defect in the workpiece 4, and (B) of FIG. 13 is an example of comparison (Dw) between regions of interest R3 and R4 with no defects. (C) of FIG. 13 is an example of a result of illuminating and imaging a portion of the scratch HL on the hairline in an illumination light emission pattern as the optimized solution that maximizes db (variations between non-defective products and defective products; how easily defects are recognizable) and minimizes Dw (variations in a non-defective product or variations in individual products). As described above, it is possible to understand that the present disclosure can curb influences of variations in a non-defective product or variations in individual products of the workpieces while emphasizing defects in the workpieces 4 and improve defect determination performance.

§ 5 MODIFICATION EXAMPLES

Although the embodiment as an example of the present disclosure has been described above in detail, the above description is merely illustration of an example of the present disclosure in all senses, it is a matter of course that various improvements and modifications can be made without departing from the scope of the present disclosure, and the following changes can be made, for example. Note that in the following description, similar reference signs will be used for components similar to those in the aforementioned embodiments, and description of points similar to those in the aforementioned embodiment will be appropriately omitted. Also, the aforementioned embodiment and the following modification examples can be configured in appropriate combination.

5.1: First Modification Example

An inspection system according to a first modification example has a configuration similar to that of the inspection system 1 according to the aforementioned embodiment other than that an evaluation expression based on an evaluation function of a difference type (db−λ·Dw) is used instead of the evaluation expression based on the evaluation function of the ratio type (db/Dw) in the Fisher's linear discrimination in the illumination optimization stage. In a case in which the evaluation function of the ratio type (db/Dw) is replaced with the evaluation function of the difference type, the evaluation expression represented by Expression (22) described below is minimized by introducing a parameter λ (>0) for adjusting db and Dw.

[Math. 16]

$$\text{minimize: } x^T Q_{within} x - \lambda x^T Q_{between} x,$$

$$\text{subject to: } \|x\|^2 = 1, Hx \geq 0 \quad (22)$$

In order to realize this, optimization based on SDP using dispersion matrixes redefined as represented by Expressions (23) and (24) described below may be performed similarly to the case of the ratio type (db/Dw). However, it is necessary to optimally select the value of λ, and it is possible to handle the case through manual parameter tuning.

[Math. 17]

$$Q'_{within} = Q_{within} - \lambda Q_{between} \quad (23)$$

$$Q'_{between} = I \quad (24)$$

Here, FIG. 14 is a photograph illustrating an example of an illumination optimization result of the Fisher's linear discrimination using the evaluation function of the ratio type (db/Dw) in the inspection device according to the present disclosure. Also, FIG. 15 is a photograph illustrating an example of an illumination optimization result of the Fisher's linear discrimination using the evaluation function of a difference type (db−λ·Dw) in the inspection device according to the present disclosure. Both the photographs are workpiece images in a region corresponding to the region of interest R1 with the defect (the scratch HL on the hairline) illustrated in (A) of FIG. 13 to (C) of FIG. 13. In the case in which the evaluation function of the difference type is used as illustrated in FIG. 15, it is possible to search for an optimized solution by appropriately adjusting the parameter λ for adjusting db and Dw to keep a balance.

According to the configuration of the first modification example, there are advantages that it is possible to obtain an illumination parameter that causes variations in non-defective product to be less easily recognizable and to cause defects to be easily recognizable and a problem of determining an absolute value of a solution is easily handled, similarly to the ratio type. Further, it is possible to obtain the optimized solution in a single shot, in particular, at a high speed.

5.2: Second Modification Example

As described above, the optimal projection direction of the Fisher's linear discrimination can be obtained as a maximum eigenvector of an eigenvalue in a general eigenvalue problem by the Lagrange undetermined multiplier method. However, since it is not possible to actually realize a negative illumination intensity although the eigenvector can be a negative value in the illumination optimization, there may be a case in which handling of this point is effective.

On the other hand, the second modification example is an example in which the optimization calculation unit 14 includes a restriction condition that all components of the illumination parameter vector are non-negative values in the Fisher's linear discrimination. Therefore, it is possible to obtain an optimized illumination parameter vectors, all components of which are positive values, according to the modification example.

More specifically, a method of calculating an illumination optimal solution under a non-negative condition at a high speed by a mathematical programming method will be described here. An original problem is to maximize the evaluation expression of the Fisher's linear discrimination represented by Expression (25) described below.

[Math. 18]

$$\text{maximize } \frac{x^T Q_{between} x}{x^T Q_{within} x},$$

$$\text{subject to: } \|x\|^2 = 1, Hx \geq 0 \quad (25)$$

Here, the description Hx≥0 means that all elements of the vector Hx are non-negative. Further, this problem can also be deformed as represented by Expression (26) described below without losing generality.

[Math. 19]

$$\text{minimize: } x^T Q_{within} x,$$

$$\text{subject to: } x^T Q_{between} x = 1, Hx \geq 0 \quad (26)$$

This is known as a so-called nonconvex-quadratic constrained quadratic programming (QCQP) problem, is typically an NP difficult optimization problem, and takes a significantly long time to search for a solution. In order to achieve this optimization in a short period of time, alleviation to a semidefinite programming (SDP) is conducted. Specifically, xx<T> is replaced with a semidefinite value matrix X to deform the problem into an optimization problem that can be expressed by Expression (27) below.

[Math. 20]

$$\text{minimize: } \langle X, Q_{within} \rangle_F,$$

$$\text{subject to: } \langle X, Q_{between} \rangle_F = 1, HXH^T \geq 0, X \geq 0, X^T = X \quad (27)$$

Here, <A, B>F=tr(AB<T>) means a Frobenius inner product of the matrix, HXH<T>≥0 means that all elements of the matrix are non-negative, that the matrix X in Expression (28) described below included in Expression (27) is a semidefinite value, and X<T>=X is a symmetric matrix.

[Math. 21]

$$X \geq 0 \quad (28)$$

For this problem, it is possible to obtain the optimized solution X at a high speed with an SDP solver. It is known from the number of SDP constraining conditions that the rank of the solution is substantially 1, and in that case, approximation of X=xx<T> can be performed. Therefore, the optimized solution vector u is obtained by obtaining an eigenvector corresponding to the maximum of the eigenvalue through eigenvalue decomposition of HXH<T>=Hxx<T>H<T>=uu<T>. Also, since u≥0 is secured when HXH<T>0 due to a theorem of Perron-Frobenius, it is possible to use the optimized solution as it is on the assumption that all the components are non-negative illumination setting values.

5.3: Third Modification Example

While there is a case in which it is difficult to apply a solving method as a general eigenvalue problem according to the aforementioned second modification example, the third modification example is an example on the assumption that the eigenvector can be a negative value. FIG. 7 is a schematic view illustrating an overview of a procedure for acquiring an inspection workpiece image according to the third modification example. As illustrated in the drawing, a case in which the illumination parameter vector obtained as an optimized solution is x including components x1, x2, and x4 that are positive values and components x3 and x5 that are negative values, for example, as illustrated in FIG. 7 is assumed in the modification example. In this case, the optimization calculation unit 143 obtains a first optimized illumination light emission pattern based on a vector x+= (x1, x2, 0, x4, 0) configured with components that are positive values and obtains a second optimized illumination light emission pattern based on a vector x−=(0, 0, −x3, 0, −x5) configured with absolute values of components that are negative values. Note that since x3 and x5 are negative values, the component description of the vectors is −x3 and −x5. Then, the camera 102 and the image-capturing unit 141 acquires a first image and second image by illuminating and imaging the workpiece to be inspected in the first optimized illumination light emission pattern and the second optimized illumination light emission pattern, and the determination unit 144 outputs an inspection workpiece image on the basis of a difference between the first image and the second image.

According to the configuration of the third modification example, it is possible to obtain an optimized solution that mathematically completely reproduces a maximum eigen vector of an eigenvalue in the general eigenvalue problem and to reproduce an illumination intensity of a negative value in a pseudo manner. It is thus possible to obtain effects similar to those obtained by directly imaging a workpiece to be inspected in an optimized illumination light emission pattern based on an original optimized illumination parameter vector in which positive values and negative values are present together in a pseudo manner.

5.4: Fourth Modification Example

The fourth modification example is also an example on the assumption that an eigenvector can be a negative value and is an example in which an imaging condition in multi-shot inspection is calculated using the criteria of the Fisher's linear discrimination. Generally, a projection vector is calculated as a maximum eigenvector of an eigenvalue in a general eigenvalue problem in the Fisher's linear discrimination. However, it is possible to extract more information by regarding, as a feature portion space, a linear portion space configured with chosen M (L>M≥1) eigenvectors in order from a larger one as in main component analysis as long as the eigenvalue is not zero. Note that it is possible to extract more information while a feature compression rate decreases. However, if the value of M is set to be equal to or greater than the number L of illuminations, the setting is equivalent to acquisition of all pieces of information obtained from the multi-channel illumination, and therefore, there is no meaning in optimizing an illumination light emission pattern based on an idea of the Fisher's linear discrimination. Also, since a cycle time increases as M increases, it is preferable to determine M on the basis of a cycle upper limit that is allowable for the inspection process.

More specifically, in the fourth modification example, in a case in which illumination parameter vectors obtained as an optimized solution includes components of positive values and negative values, optimization calculation unit 143 chooses a plurality of (for example, M; corresponding to the number of dimensions of the feature portion space) eigenvectors of large eigenvalues in main component analysis as the illumination parameter vectors. Then, for each of the plurality of eigenvectors, a first optimized illumination light emission pattern based on vectors configured with the components of positive values is obtained, and a second optimized illumination light emission pattern based on a vector configured with absolute values of the components of negative values is obtained.

Further, the camera 102 and the image-capturing unit 141 acquire a first image and a second image by illuminating and imaging the workpiece to be inspected in the first optimized illumination light emission pattern and the second optimized illumination light emission pattern corresponding to each of the plurality of eigenvectors. Then, the determination unit 144 acquires an inspection workpiece image on the basis of a difference between the first image and the second image thereof. Note that processing of and after dividing vectors into vectors of the positive value components and vectors of absolute values of the negative value components in the processing in the modification example is substantially equivalent to the processing in the third modification example illustrated in FIG. 7 other than that M eigenvectors are chosen and images are captured 2M times for positive and negative values.

Also, (A) of FIG. 8 and (B) of FIG. 8 are flowcharts illustrating an example of processing procedures in an illumination optimization stage and an inspection stage according to the fourth modification example, respectively. The processing in the fourth modification example is similar to the processing in the flowcharts illustrated in (A) of FIG. 6 and (B) of FIG. 6 other than that the number M of dimensions of the feature portion space is output in Step S412, an illumination light emission pattern based on optimized illumination parameter vectors u1, u2, . . . , u2M for inspection is calculated in Step S414, and inspection workpiece images are captured in 2M optimized illumination light emission patterns at the time of inspection in Step S420.

According to the configuration of the fourth modification example, it is possible to obtain effects equivalent to those obtained by directly imaging a workpiece to be inspected in illumination light emission patterns (multiple shots) of a plurality of original illumination parameter vectors in which positive values and negative values are present together in a pseudo manner. Also, since the configuration is substantially for multi-shot inspection of a multiple number of images, it is possible to significantly enhance inspection performance as compared with single-shot inspection. Further, since a dark current offset value is cancelled by using the difference between the first image and the second image, it is also possible to omit dark current correction if black levels of both the images are the same.

5.5: Fifth Modification Example

The fifth modification example is an example in which a set of images as a result of multi-shot imaging are collectively handled as one huge column vector since information obtained by a set of captured images in multi-shot inspection is handled. In other words, in the fifth modification example, the optimization calculation unit 143 performs illumination optimization using an illumination light emission pattern for evaluation corresponding to one column vector in which a plurality of illumination parameter vectors configuring the illumination light emission patterns for evaluation are superimposed in a case in which the illumination light emission pattern for evaluation is for multiple shots. Then, the optimization calculation unit 143 calculates an optimized illumination light emission pattern for multiple shot that maximizes (an evaluation value of) the first index and minimizes (an evaluation value of) the second index.

When multi-shot inspection of M images is performed, one large vector g obtained by stacking m-th (1≤m≤M) captured image vectors gm are stacked in the column direction will be defined as Expression (29) described below.

[Math. 22]

$$g = \Sigma_{m=1}^{M} d_m \otimes g_m \tag{29}$$

In the above expression, each operator is as follows.

[Math. 23]

$\otimes$: indicates a Kronecker product
$d_i$: indicates a standard basis of $\mathbb{R}^M$ The captured image gm of each of multiple shots is expressed as represented as Expression (30) described below by expressing image synthesis weights as wi and m.

[Math. 24]

$$g_m = \Sigma_{i=1}^{N} w_{i,m} f_i \tag{30}$$

If these are collectively written again, it is possible to express these as Expressions (32) and (33) described below using a multi-shot image synthesis weight matrix W of N×M that expresses an image synthesis weight vector in m-th imaging (corresponding to x in the aforementioned case of single shot) by Expression (31) described below.

[Math. 25]

$$[W]_{i,m} \in \mathbb{R}^N \tag{31}$$

$$g = Af \tag{32}$$

$$A = W^T \otimes I, (HW \geq 0) \tag{33}$$

Var (S, m) in a case in which this definition is used is similarly expressed as Expression (34) described below and can be expressed as a secondary form of the illumination parameter vector similarly to the case of the single shot. Note that vecW is expressed by Expression (35) described below.

[Math. 26]

$$\text{Var}(S, m) = \mathbb{E}_{f \in S} \left\| g - \mathbb{E}_{f \in S} g \right\|^2 \tag{34}$$

$$= tr ARA^T = tr(W^T \otimes I)R(W \otimes I)$$

$$= tr W^T QW = (vecW)^T (I \otimes Q)(vecW)$$

$$vec\, W = [[W]_{i,1}^T, [W]_{i,2}^T, \ldots, [W]_{i,M}^T]^T \tag{35}$$

Here, if this situation is regarded as a situation in which the illumination parameter vector x in the case of single shot is replaced with vecW, the dispersion matrix can be formulated as the same problem as that in the case of the single shot on the assumption that the dispersion matrix Q in the case of the single shot is replaced with Expression (36) described below in the case of the multiple shots. Non-negative conditions are handled with deformation as in Expressions (37) to (39) described below.

[Math. 27]

$$I \otimes Q \tag{36}$$

$$HW \geq 0 \tag{37}$$

$$(I \otimes H) vec\, W \geq 0 \tag{38}$$

$$(I \otimes H) X (I \otimes H^T) \geq 0 \tag{39}$$

Then, each of the dispersion matrixes corresponding to the expectation values $D_{between}$ and $D_{within}$ is obtained as Expression (40) described below similarly to the case of the illumination optimization in the single-shot inspection, and an optimal solution is obtained by returning to the mathematical programming method using these dispersion matrixes.

[Math. 28]

$$I \otimes Q_{within}, I \otimes Q_{between} \tag{40}$$

According to the fifth modification example, one column vector is an illumination parameter matrix including a plurality of illumination parameter vector, and it is possible to obtain an optimal illumination light emission pattern for multiple shots with arbitrary number of captured images.

5.6: Sixth Modification Example

In optimization of illumination based on the criteria of the Fisher's linear discrimination, it is possible to realize higher performance by optimizing illumination parameters and image processing parameters at the same time in a case in which linear image processing is applied to an inspection (label determination) stage of a workpiece to be inspected. Thus, the sixth modification example is an example in which the form of the image processing performed by the determination unit 144 is linear image processing and optimization for maximizing the first index db ($D_{between}$) and minimizing the second index Dw (Dwithin) performed by the optimization calculation unit 143 and optimization of the image processing parameter used in the image processing performed by the determination unit 144 are performed at the same time.

Here, (A) of FIG. 9 and (B) of FIG. 9 are flowcharts illustrating an example of processing procedures in an illumination optimization stage and an inspection stage according to the sixth modification example. The processing in the sixth modification example is similar to the processing in the flowcharts illustrated in (A) of FIG. 6 and (B) of FIG. 6 other than that Step S433 for allowing the user to designate an image processing type, for example, is executed in parallel with Step S412, the optimized illumination parameter vector u for inspection and optimized image processing B for inspection are output in Step S414, and Step S442 of applying fixed linear image processing to the inspection workpiece image is executed prior to Step S422.

As examples of linear image processing, linear image processing shown in Table 2 is exemplified. Note that f in the table denotes a workpiece image (input image) vector for inspection.

TABLE 2

| Type of linear image processing | Numerical expression | Description and effects |
| --- | --- | --- |
| Two-dimensional convolution filter | f[:,:,c]*W | W is a two-dimensional alignment (* is two-dimensional convolution). <br> (Effect) Space frequency filter |
| Two-dimensional convolution filter (separation type) | f[:,:,c]*($w_1 \otimes w_2$) | $w_1 \cdot w_2$ is one-dimensional alignment (* is two-dimensional convolution). <br> (Effect) The number of parameters is reduced by limiting them to frequency properties independent on the x axis and the y axis. |
| Three-dimensional convolutional filter | f*W | W is three-dimensional alignment (* is three-dimensional convolution). <br> (Effect) Space frequency filter including colors |
| Three-dimensional convolutional filter (separation type) | f*($w_1 \otimes w_2 \otimes w_3$) | $w_1 \cdot w_2 \cdot w_3$ is one-dimensional alignment (* is three-dimensional convolution). <br> (Effect) The number of parameters is reduced by limiting them to frequency properties independent on the x axis, the y axis, and colors. |
| Color conversion | $w^T f[x,y,:]$ | w is a three-element vector. <br> (Effect) Grayscale |
| Color channel number conversion | wf[x,y,:] | W is an n x 3 matrix. <br> (Effect) conversion of color and the number of channels |
| Partial space projection | $\left(\sum_{n=1}^{N} \phi_n \phi_n^T\right) f$ | $\phi$ is an orthonormal basis. <br> (Effect) It is possible to extract spatial main components or remaining components using a PCA or ICA algorithm. |
| Linear conversion | Bf | B is a matrix. <br> (Effect) It is possible to configure linear conversion including all the above elements. |

As described above, although arbitrary linear image processing can be described using a matrix expression B, constraining conditions between variables within B differ depending on image processing types. For example, the image g after application of the image processing in the single-shot inspection can be expressed as Expression (41) described below.

[Math. 29]

$$g = B \sum_{i=1}^{N} x_i f_i = Af \quad (41)$$

Here, each of A and F represents a multi-channel image (one large column vector) obtained by organizing projection matrixes defined by Expressions (42) and (43) described below and N images in the vertical direction.

[Math. 30]

$$A = x^T \otimes B \quad (42)$$

$$f = \sum_{i=1}^{N} e_i \otimes f_i \quad (43)$$

In the above expressions, each operator is as follows.

[Math. 31]

$\otimes$: indicates a Kronecker product
$e_i$: indicates a standard basis of $\mathbb{R}^{N_i}$ Var(S, m) in the case in which the definition is used is similarly expressed as Expression (44) described below.

[Math. 32]

$$\mathrm{Var}(S, m) = \mathop{\mathbb{E}}_{f \in S} \left\| g - \mathop{\mathbb{E}}_{f \in S} g \right\|^2 = \mathop{\mathbb{E}}_{f \in S} \left\| A\left(f - \mathop{\mathbb{E}}_{f \in S} f\right) \right\|^2 \quad (44)$$

$$= tr A R A^T = tr(x^T \otimes B) R (x \otimes B^T) = x^T Q_B x$$

In the above expression, the matrix QB is specifically expressed as Expression (45) described below.

[Math. 33]

$$[Q_B]_{i,j} = tr B \mathop{\mathbb{E}}_{f \in S} \left( f_i - \mathop{\mathbb{E}}_{f_i} f_i \right) \left( f_j - \mathop{\mathbb{E}}_{f_j} f_j \right)^T B^T \quad (45)$$

$$= \mathop{\mathbb{E}}_{f \in S} \left( f_j - \mathop{\mathbb{E}}_{f_j} f_j \right)^T B^T B \left( f_i - \mathop{\mathbb{E}}_{f_i} f_i \right)$$

Var(S, m) described here is not in the secondary form in regard to the illumination vector x and the image processing B, it is not possible to perform optimization at the same time by a method similar to that in each example described hitherto. However, since a secondary form in regard to the illumination vector x is achieved by fixing the image processing B, and on the other hand, a secondary form in regard to the image processing B is achieved by fixing the illumination vector x, it is possible to achieve approximation to a result obtained in the case in which optimization is performed at the same time by iteratively and mutually repeating the optimization with each of the image processing B and the illumination vector x fixed. The optimization of the illumination vector x in the case in which the image processing B is fixed can be performed at a high speed by a mathematical programming method such as SDP similarly to the aforementioned method through replacement of the definition of the matrix Q with QB.

Also, it is possible to handle optimization of the image processing B in the case in which the illumination vector x is fixed by rewriting Var(S, m) as Expressions (46) and (47) described below.

[Math. 34]

$$\text{Var}(S, m) = x^T Q_B x = \sum_{i,j} x_i x_j [Q_B]_{i,j} = tr B P_x B^T \quad (46)$$

$$= (vec B^T)^T (I \otimes P_x)(vec B^T)$$

$$P_x = \sum_{i,j} x_i x_j \mathop{\mathbb{E}}_{f \in S} \left( f_i - \mathop{\mathbb{E}}_{f_i} f_i \right) \left( f_j - \mathop{\mathbb{E}}_{f_j} f_j \right)^T \quad (47)$$

Generally, there are constraining conditions in the optimization of the matrix B of the image processing. In a case in which image processing is a convolution filter, for example, the shape of the matrix B is constrained to a Toeplitz matrix, and in order to maintain brightness (DC component) at a constant value, a sum of coefficients is constrained to be a constant value in many cases. Since constraining conditions change depending on specific content of the image processing in the inspection stage, it is not possible to provide a specific generalized expression. However, with many of these, it is possible to obtain an optimized solution at a high speed by similarly returning evaluation criteria of the Fisher's linear discrimination to SDP. Also, the aforementioned algorithm is expressed as steps represented by Expressions (48) to (50) described below using a group of image processing B that satisfies the constraining conditions.

[Math. 35]

Step (1)

$$B^{(0)} = I \quad (48)$$

(Step 2)

$Q'_{between}$ and $Q'_{within}$ corresponding to QB are calculated on the basis of $B^{(i)}$.

(Step 3)

$$x^{(i)} = \arg\max_{\|x\|^2 = 1, Hx \geq 0} \frac{x^T Q'_{between} x}{x^T Q'_{within} x} \quad (49)$$

(Step 4)

$P_{between}$ and $P_{within}$ corresponding to Px are calculated on the basis of $x^{(i)}$.

(Step 5)

$$B^{(i+1)} = \arg\max_{B \in \mathcal{B}} \frac{tr B P_{between} B^T}{tr B P_{within} B^T} \quad (50)$$

(Step 6)

i←i+1 is set and the processing is returned to Step 2 until the evaluation value is sufficiently converged.

In the case of multi-shot inspection, image processing is expressed as a matrix description B similarly to the case of single-shot inspection, and it is generally assumed that one column vector in which M image vectors gm (1≤m≤M) are stacked is input as an input. The image g after application of the image processing can be expressed as Expression (51) described below.

[Math. 36]

$$g = B \Sigma_{m=1}^M d_m \otimes g_m \quad (51)$$

In the above expression, each operator is as follows.

[Math. 37]

$\otimes$: indicates a Kronecker product
$d_i$: indicates a standard basis of $\mathbb{R}^M$ The captured image gm of each of multiple shots is expressed as Expression (52) described below by expressing an image synthesis weight as $w_{i,m}$.

[Math. 38]

$$g_m = \Sigma_{i=1}^N w_{i,m} f_i \quad (52)$$

If these are collectively written again, it is possible to express these as Expressions (54) and (55) described below using a multi-shot image synthesis weight matrix W of N×M that expresses an image synthesis weight vector in m-th imaging (corresponding to x in the aforementioned case of single shot) by Expression (53) described below.

[Math. 39]

$$[W]_{i,m} \in \mathbb{R}^N \quad (53)$$

$$g = Af \quad (54)$$

$$A = W^T \otimes B, (HW \geq 0) \quad (55)$$

In a case in which the definition is used, optimization of the N×M multi-shot image synthesis weight matrix W in a case in which the image processing B is fixed is performed by developing Var (S, m) as Expression (56) described below. The definition of QB is equivalent to that in the case of the single-shot inspection, this evaluation expression is in the same form as that in the case in which no image processing in the inspection stage is included, and optimization can be achieved by a similar method.

[Math. 40]

$$\text{Var}(S, m) = \mathop{\mathbb{E}}_{f \in S} \left\| g - \mathop{\mathbb{E}}_{f \in S} g \right\|^2 = \mathop{\mathbb{E}}_{f \in S} \left\| A \left( f - \mathop{\mathbb{E}}_{f \in S} f \right) \right\|^2 \quad (56)$$

$$= tr A R A^T = tr (W^T \otimes B) R (W \otimes B^T) = tr\, W^T Q_B W$$

$$= (vec W)^T (I \otimes Q_B)(vec W)$$

It is possible to address the optimization of the image processing B in the case in which the N×M multi-shot image synthesis weight matrix W is fixed by rewriting Var(S, m) as Expressions (57) and (58) described below.

[Math. 41]

$$\text{Var}(S, m) = tr\, W^T Q_B W = \sum_{i,j} [WW^T]_{i,j} [Q_B]_{i,j} \quad (57)$$

$$= tr B P_W B^T = (vec B^T)^T (I \otimes P_W)(vec B^T)$$

$$P_W = \sum_{i,j} [WW^T]_{i,j} \mathop{\mathbb{E}}_{f \in S} \left( f_i - \mathop{\mathbb{E}}_{f_i} f_i \right) \left( f_j - \mathop{\mathbb{E}}_{f_j} f_j \right)^T \quad (58)$$

Similarly, it is generally possible to obtain an optimized solution by returning the optimization of the matrix B of the image processing to SDP or the like with constraining conditions employed in this case as well. Note that since a method of alternately optimizing the multi-shot image synthesis weight matrix W and the image processing B is also equivalent, detailed description will be omitted here.

Here, (A) of FIG. 16 to (C) of FIG. 16 are schematic plan views illustrating examples of the display screen of the user interface according to the sixth modification example (and the seventh modification example, which will be described later). (A) of FIG. 16 is a pop-up window PW for selecting linear image processing, and a button Bz for selecting a screen for setting coefficient parameters in various kinds of linear image processing is also displayed. If a convolution filter is selected through tapping or the like from the pop-up window PW, then the screen for selecting a type (Table 2) of linear image processing as illustrated in (B) of FIG. 16 is displayed. If a desired image processing type is selected, a screen for selecting a predefined coefficient or a determination algorithm corresponding to simultaneous optimization (sixth modification example) or the image processing type is then displayed.

According to the sixth modification example, it is possible to handle both single-shot inspection and multi-shot inspection and to optimize an illumination light emission pattern used in the inspection stage and the linear image processing at the same time.

5.7: Seventh Modification Example

The seventh modification example is an example in which linear image processing is performed on an evaluation workpiece image captured in the illumination optimization stage in illumination optimization based on the criteria of the Fisher's linear discrimination. In other words, in the seventh modification example, the optimization calculation unit 143 performs linear image processing on the acquired evaluation workpiece image prior to calculation of an optimized illumination light emission pattern.

Here, (A) of FIG. 10 and (B) of FIG. 10 are flowcharts illustrating an example of processing procedures in the illumination optimization stage and the inspection stage according to the seventh modification example. Processing in the seventh modification example is similar to the processing in the flowcharts illustrated in (A) of FIG. 9 and (B) of FIG. 9 other than that a fixed parameter for linear image processing performed in Step S454 performed later is designated in Step S433 and linear image processing using the designated parameter is performed on the evaluation workpiece image (or an image area) in Step S454 performed prior to Step S414.

Examples of the linear image processing performed here include processing of causing images to conform by focusing only on a specific frequency band or cutting DC components in order to ignore variations in offset. The optimization method is equivalent to the method of optimizing only the illumination vector x with the image processing B fixed similarly to the sixth modification example. Similarly to the sixth modification example, it is possible to perform desired linear image processing, filter setting, and the like using the examples of the display screen of the user interface illustrated in (A) of FIG. 16 to (C) of FIG. 16 in the seventh modification example as well.

According to the seventh modification example, it is possible to handle both single-shot inspection and multi-shot inspection. Also, it is possible to cause images to conform to each other or to be divergent from each other by focusing only on a specific frequency band, and further, it is possible to suitably cause images to conform to each other or to be divergent from each other even in a case in which processing of cutting DC components is included to ignore variations in offset due to a change with time.

5.8: Eighth Modification Example

As described above, the illumination design based on the Fisher's linear discrimination is a method having evaluation criteria that differences between non-defective products and defective-products are increased to cause defects to be easily recognizable and that variations in a non-defective product are reduced, and this is a method focusing on differences in a plurality of images. However, there may be a case in which it is more convenient to calculate an evaluation value from a single image and to maximize or minimize the evaluation value than handling differences in images depending on problem setting (for example, a case in which it is desired to simply increase or decrease contrast in a specific area).

Thus, the eighth modification example is an example in which the image area setting unit 142 or the optimization calculation unit 143 substitute an image in which all pixel values are zero in one of images in the region of interest (ROI) as comparison targets. In other words, a specific optimization method in the case in which an evaluation value is calculated from a single image in the eighth modification example can be realized by substituting an image in which all pixel values are zero to one of images to be compared in the case of the single-shot inspect in the seventh modification example. Also, in a case in which contrast is handled as an evaluation criterion, it is only necessary to set a high pass filter, for example, in the image processing B. More specifically, Var(S, m) is replaced with Expression (59) described below after the number of elements in the sample image are S is set to 1.

[Math. 42]

$$\text{Var}(f) = \|g\|^2 = \|Af\|^2 = tr\,ARA^T \quad (59)$$
$$= tr(x^T \otimes B)R(x \otimes B^T) = x^T Q_B x$$

Also, since the final form of the expansion is the same, the procedure for optimization in the case of single shot is the same as that in the case of the seventh modification example. Also, the procedure for the multi-shot inspect is also the same as that in the case of the multi-shot inspection in the seventh modification example.

Also, as another variation, a pattern in which optimization to approach a prescribed image $g_0$ is performed is conceivable. In this case, Var(S, m) is replaced with Expression (60) below. Note that since a primary form of x is placed in the evaluation expression in this case, it is not possible to achieve optimization by exactly the same method as that described hitherto. Thus, specific examples of the optimization method include utilization of a so-called nonconvex QP problem solver using an evaluation function of a difference type.

[Math. 43]

$$\text{Var}(f) = \|g - g_0\|^2 = \|Af - g_0\|^2 \quad (60)$$
$$= tr ARA^T - 2(Af, g_0) + \|g_0\|^2$$
$$= tr(x^T \otimes B)R(x \otimes B^T) - 2\langle(x^T \otimes B)f, g_0\rangle + \|g_0\|^2$$
$$= x^T Q_B x + 2\langle q_B, x\rangle + \|g_0\|^2$$

Here, variations of the evaluation expression from a single image that can be applied to the eighth modification example will be shown in Table 3.

TABLE 3

| Type of evaluation expression | Numerical expression | Description |
| --- | --- | --- |
| Specific frequency component size | $\|W*g\|^2$ | W is a two-dimensional or three-dimensional alignment.<br>* is a two-dimensional or three-dimensional convolution. |
| Specific pattern size (size of a component belonging to a specific partial space) | $\left\|\left(\sum_{n=1}^{N}\phi_n\phi_n^T\right)g\right\|^2$ | φ is an orthonormal basis. |
| Coincidence of a patch cut from image | $\|(B_1-B_2)g\|^2$ | B1 and B2 correspond to operations of cutting regions from the image g (the cutting sizes are assumed to be the same). |
| Coincidence with an image template | $\|g-g_0\|^2$<br>(* with a primary term) | $g_0$ is a prescribed template image. |
| Coincidence of brightness (average color) | $\|b^T g-\tau\|^2$<br>(* with a primary term) | b represents, as a vector, an operation of obtaining an inner product of a color vector obtained by an operation of averaging a prescribed range of the image g and a prescribed color vector.<br>τ is a target QL value. |
| Coincidence of brightness and color | $\|Bg-g_0\|^2$<br>(* with a primary term) | B is an operation of averaging a prescribed range of the image g (a color vector is output).<br>$g_0$ is a target color vector. |
| Coincidence of color ratio | $\|bb^T Bg-Bg\|^2$ | B is an operation of averaging a prescribed range of the image g (a color vector is output).<br>b is a color ratio vector to be focused (standardized such that an L2 norm becomes one). |

Here, (A) of FIG. 17 and (B) of FIG. 17 are schematic plan views illustrating examples of the display screen of the user interface according to the eighth modification example. In (A) of FIG. 17, an image in a region of interest (ROI) R0 designated by the user, an index Ind (including a weight) of the region of interest R0, and a touch button Bt for displaying a pop-up window PW for setting details illustrated in (B) of FIG. 17 are displayed. In the pop-up window PW in (B) of FIG. 17, various buttons for setting strength of a low pass filter LPF and a high pass filter HPF for the user to adjust a specific frequency component in the region of interest R0 are displayed. Also, a gauge GL indicating a set level of the low pass filter LPF and a gauge GH indicating a level of the high pass filter HPF are disposed in the vicinity of the buttons. As described above, since the eighth modification example substantially corresponds to evaluation using a single image, the eighth modification example is useful in a case in which an evaluation value calculated from a single image is maximized or minimized.

5.9: Ninth Modification Example

It is possible to obtain a solution with averagely satisfactory performance for a plurality of sample image areas by the methods described hitherto. However, it is generally difficult to cause a plurality of conditions to be met at the same time since some of the conditions are competitive. Therefore, preparing a plurality of optimal solutions with clear differences (inflections) through selection or exclusion of conditions to allow the user to perform comparison and consideration, for example, is more advantageous in practice than averaging performance, depending on cases. Thus, the ninth modification example is an example in which weights are introduced into evaluation criteria and user makes selection through comparison of a plurality of solutions obtained by causing the weights to change (deviate). In other words, in the ninth modification example, the optimization calculation unit 143 obtains a plurality of optimized illumination light emission patterns on the basis of a plurality of illumination parameter vectors obtained as optimal solutions (suitable solutions) in a case in which weights are applied to the first index db and the second index Dw. In terms of optimization for multiple purposes, the optimal solutions described hitherto means Pareto optimal solutions.

More specifically, it is possible to add weights indicating importance to sample images in an image group in calculation of a dispersion matrix using the evaluation criteria of the Fisher's linear discrimination. It is thus possible to keep a balance of importance among a plurality of inter-image distances. Also, each weight may be adjusted using an evaluation expression to which a dispersion matrix with a meaning of "an evaluation expression from a single image" has been added in addition to the dispersion matrix with the meaning of these inter-image distances. It is thus possible to keep a balance between importance of a plurality of inter-image distances and importance of a plurality of evaluation values, each of which is from a single image.

Moreover, the weights may be able to be adjusted depending on the regions of interest (ROI). It is thus possible to collectively keep a balance of importance in accordance with differences in regions of interest. Also, the weights of these sample images may be adapted such that the dispersion matrix is a positive constant factor of I (unit matrix) in a case in which all the weights are zero. It is thus possible to keep a balance between maximization and optimization, that is, a balance between "coincidence of non-defective images" and "divergence of defective images". Moreover, the aforementioned weight among sample images, the weight of the single image evaluation expression, the weight of the regions of interest, and the weight of the balance between maximization and optimization are preferably designed to be mutually independently adjustable. This facilitates the manual adjustment of the user since each weight is regarded as an independent axis.

Then, a specific evaluation expression of a dispersion matrix that summarizes the above description and satisfies all the conditions will be considered. Here, it is assumed that matrixes and vectors indicating various optimization conditions are defined as shown in Table 4. Here, $N_{p,k}$ is the number of samples of workpieces belonging to a designated region of interest and a label (class, category), and it is assumed that $1 \le s \le N_{p,k}$.

TABLE 4

|  | Closeness of images (relative evaluation value) | Evaluation value from a single image (absolute evaluation value) |
|---|---|---|
| Criterion for minimization | $Q_{within}^{(p, k, s)}$ | $Q_{within}'^{(p, k, s)}, q_{within}^{(p, k, s)}$ |
| Criterion for maximization | $Q_{between}^{(p, k)}$ | $Q_{between}'^{(p, k, s)}, q_{between}^{(p, k, s)}$ |

"Closeness of images" is a square average (that is, dispersion) of a distance from an average image, and in a case in which $N_{p,k}=2$, the closeness of images is equivalent to the distance between a pair of images. Also, weight coefficients shown in Table 5 are introduced to merge these into one evaluation criterion. These can be set by the user. All the weight coefficients are assumed to be in a value range of equal to or greater than 0 and equal to or less than 1.

TABLE 5

|  | Closeness of images | Evaluation value from a single image | ROI comparison target group | Entire intensity |
|---|---|---|---|---|
| Criterion for minimization | $\alpha_{p, k, s}$ | $\alpha'_{p, k, s}$ | $\gamma_p$ | $\delta_{within}$ |
| Criterion for maximization | $\beta_{p, k}$ | $\beta'_{p, k, s}$ | $\gamma_p$ | $\delta_{between}$ |

At this time, examples of generating the matrixes that satisfy the aforementioned requirements will be represented as Expressions (61) to (64) described below. Note that it is also assumed that an average vector m that is needed prior to the generation of each of the matrixes is similarly calculated with a weight.

[Math. 44]

$$Q_{between} = \prod_{p,k}(1 - \delta_{between}\gamma_p\beta_{p,k})\prod_{s=1}^{N_{p,k}}(1 - \delta_{between}\gamma_p\beta'_{p,k,s})I + \quad (61)$$

$$\delta_{between}\sum_p\gamma_p\sum_k\left(\beta_{p,k}Q_{between}^{(p,k)} + \sum_{s=1}^{N_{p,k}}B'_{p,k,s}Q_{between}'^{(p,k,s)}\right)$$

$$q_{between} = \delta_{between}\sum_p\gamma_p\sum_k\sum_{s=1}^{N_{p,k}}B'_{p,k,s}q_{between}^{(p,k,s)} \quad (62)$$

$$Q_{within} = \prod_{p,k,s}(1 - \delta_{within}\gamma_p\alpha_{p,k,s})(1 - \delta_{within}\gamma_p\alpha'_{p,k,s})I + \quad (63)$$

$$\delta_{within}\sum_p\gamma_p\sum_k\left[\sum_{s=1}^{N_{p,k}}\alpha_{p,k,s}Q_{within}^{(p,k,s)} + \alpha'_{p,k,s}Q_{within}'^{(p,k,s)}\right]$$

$$q_{within} = \delta_{within}\sum_p\gamma_p\sum_k\sum_{s=1}^{N_{p,k}}\alpha'_{p,k,s}q_{within}^{(p,k,s)} \quad (64)$$

The criterion for maximization is invalidated when $\delta_{between}=0$ and is validated to the maximum extend when $\delta_{between}=1$. Similarly, the criterion for minimization is invalidated when $\delta_{within}=0$ and is validated to the maximum extent when $\delta_{within}=1$. The introduction of the weight coefficients described above enables the user to select, exclude, or balance a plurality of competitive evaluation criteria and to generate optimal solutions for a plurality of illumination parameters.

Hereinafter, a method for presentation to the user for allowing the user to select a more optimal solution from the optimal solutions for the plurality of illumination parameters will be described. According to the evaluation criteria of the Fisher' linear discrimination, optimization is performed with the Fisher's discriminant ratio (FDR) value that is a ratio between the evaluation value of the criterion for maximization and the evaluation value of the criterion for minimization. Although superiority and inferiority of the solutions are determined depending on how large the criteria are, this information is not sufficient in practice. In a situation in which there are solutions Ans1 and Ans2 and the ratio value of Ans1 is better than the other, for example, a situation in which although the criterion for maximization of Ans1 is much better than that of Ans2, the criterion for minimization of Ans2 is better than that of Ans1 can be present. In a case in which a difference of the ratio value between Ans1 and Ans2 is small, in particular, in such a situation, it may be more effective to directly present the values of the criterion for maximization and the criterion for minimization to the user and allow the user to select one of them. Also, a difference between sample images that can be visually recognized in the case of the solution Ans1 and in the case of the solution Ans2 may be aligned and shown to the user to allow the user to select one of them.

Here, (A) of FIG. 18 is a schematic plan view illustrating an example of the display screen of the user interface according to the ninth modification example. (A) of FIG. 18 illustrates an example of a pop-up window PW for displaying a result of setting the weight ($\delta_{between}$) of the first index db and the weight ($\delta_{within}$) of the second index Dw, which are evaluation criteria, and performing illumination optimization according to the ninth modification example. In the pop-up window PW, parameter sets Ps in which different weights have been set for db and Dw and gauges GB and GW indicating the weights B and W of db and Dw in each parameter set PS are displayed. Also, a button BS for designating alignment (sorting) of the parameter sets PS depending on the obtained ratio between db and Dw or the ratio of the weights B and W thereof and a button BE for switching whether to apply the weights or not to apply the weights (all the weights are one) as an evaluation value of the Fisher's linear discrimination, for example, are displayed below the parameter set PS in the drawing.

(B) of FIG. 18 is a flowchart illustrating an example of a processing procedure according to the ninth modification example, and (C) of FIG. 18 is a schematic plan view illustrating an example of a result selected according to the ninth modification example. As illustrated in (B) of FIG. 18, the weights of db and Dw in each parameter set PS are adjusted in the pop-up window PW or an appropriate setting screen window first to execute illumination optimization, and db and Dw or the weights B and W thereof in each parameter set PS are aligned and displayed in the pop-up window PW.

At this time, a light emission pattern of each channel illumination LSi of the light source LS, images corresponding to FIGS. 14 and 15, and the like may be displayed together as reference images for the evaluation result. Then, the user compares and considers the displayed result of each parameter set PS, and in a case in which there is a desired solution (Yes), the user selects the parameter set PS from which the solution has been obtained and ends the optimization processing. In this case, the illumination light emission pattern of the light source LS corresponding to the selected parameter set SP (the parameter set 2 in the drawing) and db and DW or the weights B and W thereof in the parameter set PS may be displayed as illustrated in (C) of FIG. 18. On the other hand, in a case in which there is no desired solution (No), the user can adjust the weights again and repeat the processing of executing the optimization.

According to the ninth modification example, it is possible to prepare a plurality of optimized solutions with clear differences (inflections) through selection or exclusion of conditions and to allow a user to perform comparison and consideration, for example. Also, it is possible to cause how images are close to each other (degrees of coincidence) and an evaluation value from a single image to be present together as evaluation criteria or to set individual weights for how images are close to each other (degrees of coincidence) and the evaluation value from the single image. Moreover, it is also possible to individually set weights for differences in regions of interest. Also, a weight between images for evaluation (sample images), a weight in a single image evaluation scheme, weights of regions of interest, and a weight of a balance between maximization and optimization can be independently adjusted, and it is possible to allow the user to easily perform adjustment.

5.10: Tenth Modification Example

The tenth modification example is a modification example of an image shape of a region of interest (ROI). Generally, a case in which an image in the region of interest is designated as a rectangular shape is assumed, and each portion in the region screen is handled with homogeneous importance. However, the user may be able to set non-uniform weights in a region of interest using a paint brush or the like. According to such a tenth modification example, it is possible to adjust coincidence, divergence, contrast, or the like of images while placing emphasis on a specific location in the region of interest.

Here, (A) of FIG. 19 and (B) of FIG. 19 are schematic plan views illustrating examples of the display screen of the user interface according to the tenth modification example. (A) of FIG. 19 displays an image in a region of interest (ROI) R0 designated by the user, an index Ind (including a weight) of the region of interest R0, and a touch button Bt for displaying the pop-up window PW for setting details as illustrated in (B) of FIG. 19. In the pop-up window PW in (B) of FIG. 19, a paint brush group Bs used by the user to set non-uniform weights in the region of interest R0 is disposed, and the image in the region of interest R0 is displayed again. The user can arbitrarily set non-uniform weights in the region of interest R0 by tapping and selecting a paint brush with a desired size from the paint brush group Bs and tapping a desired portion in the region of interest R0 as it is.

§ 6 APPENDIXES

The embodiment and the modification examples described above have been provided for easy understanding of the present invention and are not intended to allow limited interpretation of the present invention. Elements included in the embodiment and the modification examples, disposition, materials, conditions, shapes, sizes, and the like thereof are not limited to those illustrated above and can be appropriately changed. It is also possible to partially replace or combine components described in different embodiment and modification examples.

In other words, the aforementioned device for setting illumination conditions when a target is inspected, the system, or a part thereof is realized in the form of a software functional unit and is sold or used as a single product, it is possible to store the software functional unit in a computer-readable storage medium. In this manner, it is possible to realize essences of the proposed techniques of the present invention, or portions that contribute to existing techniques, or an entirety or a part of the proposed techniques in the form of a software product and to store, in a storage medium, a computer software product including commands that causes a computer device (which can be a personal computer, a server, a network device, or the like) to realize an entirety or a part of steps of the method described in each example of the present invention. The aforementioned storage medium can be various media capable of storing program codes, such as a USB, a read-only memory (ROM), a random access memory (RAM), a mobile hard disk, a floppy disk, or an optical disc.

Here, the present disclosure can also be expressed as follows in accordance with the embodiments.

Appendix 1

An inspection device (1) including:
an image-capturing unit (141) that has a light source (LS) that illuminates at least one workpiece (4) including a workpiece (4) that has areas corresponding to a plurality of different labels in a plurality of predetermined illumination light emission patterns and a sensor (102) that images the at least one workpiece illuminated in the plurality of predetermined illumination light emission patterns and acquires a plurality of workpiece images for evaluation, each of which is associated with each predetermined illumination light emission pattern and each workpiece;
an image area setting unit (142) that extracts, for a combination of the plurality of different labels and at least one region of interest (R0 to R3) with a predetermined shape, images in the region of interest in the plurality of workpiece images for evaluation and sets image areas (or a group);
an optimization calculation unit (143) which sets a first index (db) indicating variations in workpieces (4) belonging to different labels on the basis of varying components between images belonging to the different labels, sets a second index (Dw) indicating variations in workpieces belonging to the same label on the basis of varying components between images belonging to the same label, from the image area, obtains an illumination parameter vector as an optimal solution that maximizes the first index (Db) when the at least one workpiece (4) is illuminated and imaged in an illumination light emission pattern for evaluation corresponding to an arbitrary combination of the plurality of predetermined illumination light emission patterns and minimizes the second index (Dw), and calculates an optimized illumination light emission pattern on the basis of the illumination parameter vector; and a determination unit (144) which performs image processing on an inspection workpiece image obtained by the image-capturing unit (141) imaging the workpiece (4) to be inspected illuminated in the optimized illumination light emission pattern to thereby determine a label of the workpiece to be inspected.

Appendix 2

The inspection device (1) according to Appendix 1, in which the optimization calculation unit obtains, through discriminant analysis, an optimized solution that maximizes an evaluation value of an evaluation function of a ratio type based on a ratio between the first index (db) and the second index (Dw) or an evaluation value of a difference type based on the first index (db) and the second index (Dw).

Appendix 3

The inspection device (1) according to Appendix 2, in which the optimization calculation unit (143) includes a restriction condition that all components of the illumination parameter vectors are non-negative values in the discriminant analysis.

Appendix 4

The inspection device (1) according to Appendix 2,
wherein in a case in which an illumination parameter vector obtained as the optimized solution includes components of positive values and negative values, the optimization calculation unit (143) obtains a first optimized illumination light emission pattern based on vectors configured with the components of the positive values and obtains a second optimized illumination light emission pattern based on vectors configured with absolute values of the components of the negative values, the image-capturing unit (141) acquires a first image and a second image by imaging the workpiece (4) to be inspected with illumination in the first optimized illumination light emission pattern and the second optimized illumination light emission pattern, respectively, and the determination unit (144) acquires the inspection workpiece image on the basis of a difference between the first image and the second image.

Appendix 5

The inspection device (1) according to Appendix 2,
wherein in a case in which an illumination parameter vector obtained as the optimal solution includes components of positive values and negative values, the optimization calculation unit (143) chooses, as the illumination parameter vectors, a plurality of eigenvectors with large eigenvalues in main component analysis, obtains a first optimized illumination light emission pattern based on vectors configured with the components of the positive values, and obtains a second optimized illumination light emission pattern based on vectors configured with absolute values of the components of the negative values for each of the plurality of eigenvectors for each of the plurality of eigenvectors, the image-capturing unit (141) acquires a first image and a second image by imaging the workpiece (4) to be inspected with illumination in the first optimized illumination light emission pattern and the second optimized illumination light emission pattern corresponding to each of the plurality of eigenvectors, and the determination unit (144) acquires the inspection workpiece image on the basis of a difference between the first image and the second image.

Appendix 6

The inspection device (1) according to Appendix 1, in which when the illumination light emission pattern for evaluation is for multiple shots, the optimization calculation unit (143) calculates an optimized illumination light emission pattern for multiple shots that maximizes the first index (db) and that minimizes the second index (Dw) when the at least one workpiece is illuminated and imaged in an illumination light emission pattern for evaluation corresponding to one column vector obtained by superimposing the plurality of illumination parameter vectors configuring the illumination light emission pattern for evaluation.

Appendix 7

The inspection device (1) according to any one of Appendixes 1 to 6,
in which a form of image processing performed by the determination unit (144) is linear image processing, and optimization performed by the optimization calculation unit (143) to maximize the first index (db) and minimize the second index (Dw) and optimization of image processing parameters used in image processing performed by the determination unit (144) are performed at the same time.

Appendix 8

The inspection device (1) to any one of Appendixes 1 to 7, in which the optimization calculation unit (143) performs linear image processing on the evaluation workpiece image prior to the calculation of the optimized illumination light emission pattern.

Appendix 9

The inspection device (1) according to any one of Appendixes 1 to 8, in the image area setting unit (142) or the optimization calculation unit (143), an image in which all pixel values are zero is substituted in one of regions of interest to be compared.

Appendix 10

The inspection device (1) according to any one of Appendixes 1 to 8, in which the optimization calculation unit (143) obtains a plurality of the optimized illumination light emission patterns on the basis of a plurality of illumination parameter vectors obtained as the optimized solution when weights are applied to the first index (db) and the second index (Dw).

Appendix 11

A method for inspecting a workpiece (4) using an inspection device (1) that includes an image-capturing unit (141), an image area setting unit (142), an optimization calculation unit (143), and a determination unit (144), the method including:
by the image-capturing unit (141), illuminating at least one workpiece (4) including a workpiece that has areas corresponding to different labels in a plurality of predetermined illumination light emission patterns and imaging the at least one workpiece (4) illuminated in the plurality of predetermined illumination light emission patterns to acquire a plurality of evaluation workpiece images, each of which is associated with each predetermined illumination light emission pattern and each workpiece;
by the image area setting unit (142), extracting, for a combination of the plurality of different labels and at least one region of interest with a predetermined shape, an image of the region of interest in the plurality of evaluation workpiece image and setting an image area;
by the optimization calculation unit, setting a first index (db) indicating variations in workpieces (4) belonging to different labels on the basis of varying components between images belonging to the different labels and setting a second index (Dw) indicating variations in workpieces (4) belonging to the same label on the basis of varying components between images belonging to the same label, from the image area, obtaining an illumination parameter vector as an optimal solution that maximizes the first index (db) when the at least one workpiece (4) is illuminated and imaged in an illumination light emission pattern for evaluation corresponding to an arbitrary combination of the plurality of predetermined illumination light emission patterns and minimizes the second index (Dw), and calculating an optimized illumination light emission pattern on the basis of the illumination parameter vector; and
by the determination unit (144), performing image processing on an inspection workpiece image acquired by the image-capturing unit (141) imaging a workpiece (4) to be inspected illuminated in the optimized illumination light emission pattern to determine a label of the workpiece (4) to be inspected.

Appendix 12

A control program that causes a computer (100) to execute the imaging of at least one workpiece, the setting of the image areas, the calculating of the illumination light emission pattern for the optimization, and the determining of the label according to Appendix 11.

Appendix 13

A computer-readable non-transitory recording medium that records a control program for causing a computer (100) to execute the imaging of at least one workpiece, the setting of the image areas, and the calculating of the illumination light emission pattern for the optimization, and the determining of the label according to Appendix 11.

The invention claimed is:
1. An inspection device comprising:
a memory;
a processor; and
an image-capturing unit which has a sensor that images at least one workpiece illuminated in a plurality of predetermined illumination light emission pattern and obtains a plurality of evaluation workpiece images that are associated with each predetermined illumination light emission patterns and each workpiece;
wherein the processor is coupled to the image-capturing unit and the memory, and the processor is configured to implement:
an image area setting unit which sets, for the evaluation workpiece images, a plurality of image areas associated with a plurality of different labels that indicate non-defective products or defective products;
an optimization calculation unit which generates, from the image areas, a first index which increases with differences between image areas associated with labels indicating the non-defective products and contrast in image areas associated with labels indicating the defective products, generates a second index which increases with differences between the image areas associated with the labels indicating the non-defective products or contrast in the image areas associated with the labels indicating the non-defective products, and calculates an illumination light emission pattern for inspection such that the first index becomes larger and the second index becomes smaller; and
a determination unit which determines a pass/fail label of the workpiece to be inspected by performing image processing on an inspection workpiece image obtained by the image-capturing unit imaging a workpiece to be inspected illuminated in the illumination light emission pattern for inspection.

2. The inspection device according to claim 1, wherein the optimization calculation unit is adapted such that the number of light emission patterns to be evaluated when the illumination light emission pattern for inspection is calculated is larger than the number of the predetermined illumination light emission patterns.

3. The inspection device according to claim 1, wherein the optimization calculation unit generates an evaluation function on the basis of the first index and the second index and obtains an optimized solution such that when a certain illumination light emission pattern for evaluation is provided, and when the first index becomes a maximum value and the second index value becomes a minimum value at the time of illuminating and imaging the at least one workpiece, an evaluation value of the evaluation function becomes a maximum.

4. The inspection device according to claim 1, wherein the optimization calculation unit obtains, through discriminant analysis, an optimized solution that maximizes an evaluation value of an evaluation function based on a ratio between the first index and the second index or an evaluation value of an evaluation function based on a difference between the first index and the second index.

5. The inspection device according to claim 4, wherein the optimization calculation unit includes a restriction condition that all components of the illumination parameter vectors are non-negative values in the discriminant analysis.

6. The inspection device according to claim 1,
wherein in a case in which an illumination parameter vector obtained as an optimized solution includes components of positive values and negative values, the optimization calculation unit obtains a first optimized illumination light emission pattern based on vectors configured with the components of the positive values and obtains a second optimized illumination light emission pattern based on vectors configured with absolute values of the components of the negative values, the image-capturing unit acquires a first image and a second image by imaging the workpiece to be inspected with illumination in the first optimized illumination light emission pattern and the second optimized illumination light emission pattern, respectively, and the determination unit acquires the inspection workpiece image on the basis of a difference between the first image and the second image.

7. The inspection device according to claim 1, wherein in a case in which an illumination parameter vector obtained as an optimal solution includes components of positive values and negative values, the optimization calculation unit chooses, as the illumination parameter vectors, a plurality of eigenvectors with large eigenvalues in main component analysis, obtains a first optimized illumination light emission pattern based on vectors configured with the components of the positive values, and obtains a second optimized illumination light emission pattern based on vectors configured with absolute values of the components of the negative values for each of the plurality of eigenvectors, the image-capturing unit acquires a first image and a second image by imaging the workpiece to be inspected with illumination in the first optimized illumination light emission pattern and the second optimized illumination light emission pattern corresponding to each of the plurality of eigenvectors, and the determination unit acquires the inspection workpiece image on the basis of a difference between the first image and the second image.

8. The inspection device according to claim 1, wherein in a case in which the illumination light emission pattern for evaluation is for multiple shots, the optimization calculation unit calculates an optimized illumination light emission pattern for multiple shots that maximizes the first index and minimizes the second index when the at least one workpiece is illuminated and imaged in an illumination light emission pattern for evaluation corresponding to one column vector obtained by superimposing the plurality of illumination parameter vectors configuring the illumination light emission pattern for evaluation.

9. The inspection device according to claim 1, wherein a form of image processing performed by the determination unit is linear image processing, and optimization performed by the optimization calculation unit to maximize the first index and minimize the second index and optimization of image processing parameters used in image processing performed by the determination unit are performed at the same time.

10. The inspection device according to claim 1, wherein the optimization calculation unit performs linear image processing on the evaluation workpiece image prior to the calculation of the optimized illumination light emission pattern.

11. The inspection device according to claim 1, wherein the image area setting unit or the optimization calculation unit makes both the first index and the second index respectively a total values of varying components of pixel values in images in regions of interest (ROI) with the same labels.

12. The inspection device according to claim 1, wherein the optimization calculation unit obtains a plurality of the optimized illumination light emission patterns on the basis of a plurality of illumination parameter vectors obtained as an optimized solution in a case in which weights are applied to the first index and the second index.

13. A inspection method for inspecting a workpiece using an inspection device that includes an image-capturing unit, an image area setting unit, an optimization calculation unit, and a determination unit, the inspection method comprising:

an imaging step, by the image-capturing unit, imaging at least one workpiece illuminated in a plurality of predetermined illumination light emission patterns to acquire a plurality of evaluation workpiece images, each of which is associated with each predetermined illumination light emission pattern and each workpiece;

an image area setting step, by the image area setting unit, setting a plurality of image areas associated with a plurality of different labels that indicate non-defective products or defective products for the evaluation workpiece images;

a calculation step, by the optimization calculation unit, generating a first index which increases with differences between image areas associated with labels indicating the non-defective products and contrast in image areas associated with labels indicating the defective products, generating a second index which increases with differences between the image areas associated with the labels indicating the non-defective products or contrast in the image areas associated with the labels indicating the non-defective products, from the image areas, and calculating an illumination light emission pattern for inspection such that the first index becomes larger and the second index becomes smaller; and a determination step, by the determination unit, determining a pass/fail label of the workpiece to be inspected by performing image processing on an inspection workpiece image obtained by the image-capturing unit imaging a workpiece to be inspected illuminated in the illumination light emission pattern for inspection.

14. A computer-readable non-transitory recording medium that records a control program for causing a computer to execute the imaging of at least one workpiece, the setting of the image areas, and the calculating of the illumination light emission pattern for the optimization, and the determining of the pass/fail label according to claim 13.

* * * * *